(12) United States Patent
Yoshimura et al.

(10) Patent No.: US 6,385,199 B2
(45) Date of Patent: May 7, 2002

(54) METHOD AND APPARATUS FOR PACKET TRANSMISSION WITH HEADER COMPRESSION

(75) Inventors: Takeshi Yoshimura, Yokohama; Toshiro Kawahara; Takashi Suzuki, both of Yokosuka, all of (JP)

(73) Assignee: NTT Mobile Communications Network (JP)

( * ) Notice: Subject to any disclaimer, the term of this patent is extended or adjusted under 35 U.S.C. 154(b) by 0 days.

(21) Appl. No.: 09/794,842

(22) Filed: Feb. 26, 2001

(30) Foreign Application Priority Data

Mar. 3, 2000 (JP) ........................................ 2000-059368
May 1, 2000 (JP) ........................................ 2000-132685
May 18, 2000 (JP) ........................................ 2000-146787

(51) Int. Cl.[7] .............................. H04L 12/54; H04J 3/24
(52) U.S. Cl. ........................ 370/393; 370/465; 370/474; 314/758
(58) Field of Search ................................ 370/351, 392, 370/393, 230, 404, 408, 389, 411, 401, 412, 397, 399, 428, 429, 465, 473, 474, 475, 503, 509, 512; 710/52, 53; 714/746, 751, 758, 775, 776, 799, 800, 805; 709/230, 231, 247

(56) References Cited

U.S. PATENT DOCUMENTS 6,092,120 A * 7/2000 Swaminathan et al.
6,111,924 A * 8/2000 McKinley
6,134,236 A * 10/2000 Nakatsugawa
6,278,709 B1 * 8/2001 Walker et al.

* cited by examiner

*Primary Examiner*—William Luther
(74) *Attorney, Agent, or Firm*—Brinks Hofer Gilson & Lione

(57) ABSTRACT

A sender converts a non-compressed packet, which is to be transmitted, into a full-header packet including a full header or a header-compressed packet including a compressed header, and sends the converted packet to a receiver. The receiver receives the packet transmitted from the sender, and converts the received packet into a decompressed packet. In cases the full-header packet or header-compressed packet is lost between the sender and receiver, the receiver keeps header-compressed packers received during an interval from the packet loss to the next earliest reception of a full-header packet, and decompresses the compressed headers of the kept header-compressed packets on the basis of contents of the full header of the full-header packet.

11 Claims, 19 Drawing Sheets

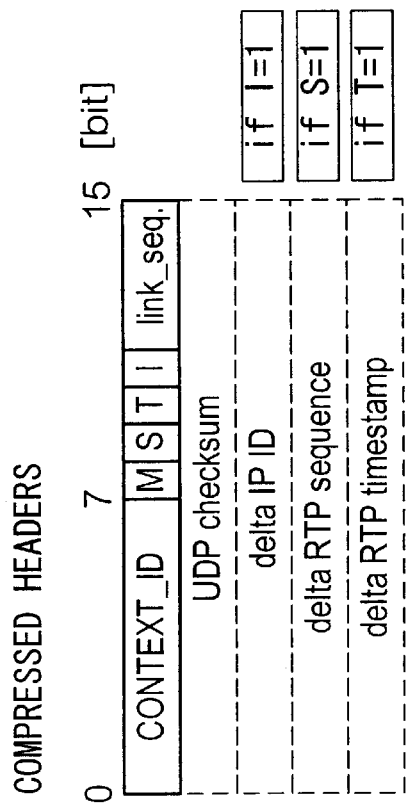
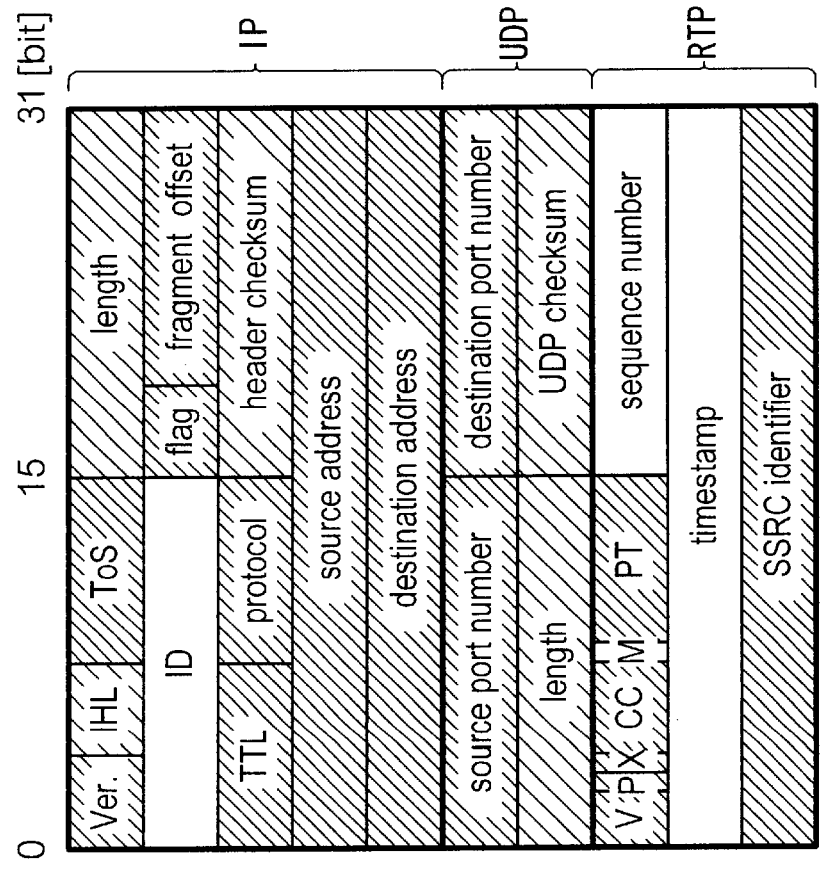
FIG. 11A
FIG. 11B

METHOD AND APPARATUS FOR PACKET TRANSMISSION WITH HEADER COMPRESSION

BACKGROUND OF THE INVENTION

1. Field of the Invention

The present invention relates to a packet transmitting method for transmitting and receiving packets among a plurality of data terminals, and a relaying device and a data terminal used for the packet transmission.

2. Description of Related Art

Recently, a demand for transmitting through the Internet such data as video data or audio data, which requires a real time transmission, has been intensified.

As a protocol to meet the demand, an RTP (Real-time Transport Protocol) is ruled by the RFC (Request For Comment) 1889, which was issued by the IETF (Internet Engineering Task Force), a group for standardizing the Internet. The RTP has functions such as 1) specification of a payload type, 2) designation of a sequence number, and 3) designation of a timestamp. These rules enable such information as audio and video data to be transmitted in real time on the Internet. Usually, the RTP is used as an upper layer for the IP (internet protocol) on a network layer and the UDP (User Datagram Protocol) on a transport layer.

FIG. 11A shows contents of an RTP header, UDP header, and IP header (hereafter, referred to as "RTP/UDP/IP headers") attached to data, such as audio and video data, to be transmitted according to the RTP, UDP and IP. Hereinafter, a packet including the RTP/UDP/IP headers is called an IP packet.

As shown in the drawing, the IP header needs 20 bytes, the UDP header does 8 bytes, and the RTP header does 12 b bytes, thus the total amount of RTP/UDP/IP headers reaches 40 bytes. In contrast, video data contained in one IP packet comprises, for example, about 50 bytes. For transmitting such image data in the form of packets, the overhead reaches therefore no less than 44 percents. Similarly, for transmitting audio data which comprises 20 bytes in one packet, the overhead reaches as much as 66 percents. Since a practical transmission needs headers for other layers to be added, the whole headers occupy a large percentage of one packet, thereby causing a drawback of reducing efficiency in communication.

As one technique to overcome the drawback, the RFC2508 issued by the IETF shows an RTP compression protocol to compress the RTP/UDP/IP headers. The RTP compression protocol permits the RTP/UDP/IP headers shown in the FIG. 11A to be compressed into a header exemplified in FIG. 11B (hereinafter referred to as a "compressed header"). This compression will be detailed as follows.

The method of the compression is applied between two nodes on a network through which packets are transmitted among a plurality of data terminals, for example. More specifically, of the two nodes, one node (hereinafter referred to as a "sender node") converts the RTP/UDP/IP headers of one part of the IP packets communicated among the data terminals into a compressed header, and transmits it, as a header-compressed packet, to the other node (hereinafter referred to as a "receiver node"). Concurrently, the sender node transmits the RTP/UDP/IP headers of the other part of the IP packets to the receiver node, as a full-header packet without any compression. The receiver node decompresses (i.e., restoration) to an IP packet the header-compressed packet or the full-header packet received from the sender node, and sends it to the next node or a receiver data terminal. The full header is a header in which lengths included in the RTP/UDP/IP headers shown in FIG. 11A are replaced by information including a CONTEXT_ID for identifying the RTP connection and a link sequence number link_seq, a serial number, given in the order of transmission from the sender node.

The content of the compressed header shown in FIG. 11B will now be explained. The data of sections with dense hatching applied in the RTP/UDP/IP headers in FIG. 11A, which includes a version number (V) written in the IP header and the payload type written in the RTP header, are constant data (hereinafter referred to as "static fields") for each packet to be transmitted from the sender node. Hence, as illustrated in FIG. 11B, the compressed header does not include data of the static fields. When the sender node sends the first IP packet of the packet stream to the receiver node, it sends a full-header packet which has a full header including the static fields. After this, the sender node converts the RTP/UDP/IP headers of the succeeding IP packets into a compressed header with no static fields included. The thus-converted compressed header is sent to the reception node as a header-compressed packet. When the receiver node receives the full header packet corresponding to the first IP packet, the receiver node restores the received RTP/UDP/IP headers with reference to the full header in the first received full-header packet, and writes the thus decompressed headers into an internal storage device. After this, the receiver node uses the static fields of the RTP/UDP/IP headers so as to restore the static fields of the compressed header in the header-compressed packets that will be received successively after the first packet.

The data in the static fields are not always constant over all the IP packets, but might be changed in a certain IP packet. If such a change occurs in a certain IP packet, the sender node will transmits a full header packet including a full header corresponding to the RTP/UDP/IP header of the IP packet to the receiver node, without compression.

The data in the sections with no hatching applied in the RTP/UDP/IP headers shown in FIG. 11A include the sequence number and timestamp of the RTP header as well as the ID of the IP header. The timestamp indicates the time at which a packet is transmitted or generated. Such data are expected to have constant difference values (changed amounts) between successive two IP packets transmitted in turn. Hereinafter, fields providing such data are referred to as "delta fields." As shown in FIG. 11B, the basic compressed header does not include the data in the delta fields. As described above, the receiver node, which holds RTP/UDP/IP headers in its storage device, adds difference values, which have been previously obtained, respectively to the values in the corresponding delta fields of the stored RTP/UDP/IP headers, thus being able to decompress delta fields of compressed headers which will consecutively be received thereafter.

However, it is not always true that the difference values in the delta fields are constant between all the IP packets. There are some cases where changes are made to their difference values. In such cases, changed difference values have to be notified to the receiver node. The receiver node is able to restore the contents in the delta fields contained in the RTP/UDP/IP headers of each header-compressed packet which will be received thereafter, with reference to the contents of the RTP/UDP/IP headers held in the storage device and the newly notified difference values. For this purpose, the compressed header shown in FIG. 11A has flags S, T and I that represent whether the difference values in the delta fields are changed or not. If any difference values are changed, the new difference values are added to the compressed header, as shown by the dotted lines in FIG. 11B. Practically, if there is a change in the difference value of the sequence number of the RTP header, "1" is set to the flag S and a sequence number difference value (delta RTP sequence) showing the new difference value of the sequence number is added to the compressed header, as shown by the dotted line in FIG. 11B. Similarly, if there is a change in the difference value of the timestamp of the RTP header, "1" is set to the flag T, and a timestamp difference value (delta RTP timestamp) showing the new difference value of the timestamp is included in the compressed header, as shown by the dotted line in FIG. 11B. Further, if there is a change in the difference value of the ID of the IP header, "1" is set to the flag I, and an ID difference value (delta IP ID) showing the new difference value of the ID is attached to the compressed header.

As shown in FIG. 11B, the compressed header further includes the CONTEXT_ID and link_seq, like the full header. The receiver node decompresses the compressed header in compliance with the contents of RTP/UDP/IP headers specified by the CONTEXT_ID. The receiver node refers to the link sequence number link_seq of each packet (header-compressed packet or full-header packet) sent in order from the sender node. When it is found that some link sequence numbers are dropped, the receiver node determines that the packets are lost between the sender and receiver nodes.

Referring to FIG. 12, procedures made for packet transmission between the sender and receiver nodes will now be described. In FIG. 12, a field A shows a static field of the RTP/UDP/IP headers (i.e., any of the data with the dense hatching applied in FIG. 11A), and a field B shows a delta field (i.e., any of the data with no hatching applied in FIG. 11A). Further, in FIG. 12, "F" represents a full-header packet, while "C" represents a header-compressed packet.

When receiving an IP packet a transmitted from a sender data terminal to a receiver date terminal, the sender node stores the RTP/UDP/IP headers of the IP packet a into its internal storage device. Concurrently, the sender node produces a full header by substituting lengths in the headers for a CONTEXT_ID and link sequence number link_seq, and transmits to the receiver node the full header packet including both the produced full header and data (hereinafter referred to as an "RTP payload"), which is the part of the IP packet excluding the RTP/UDP/IP headers (refer to "OP1" in FIG. 12). The receiver node which received this full-header packet restores the RTP/UDP/IP headers from the full header of this packet (namely, the CONTEXT_ID and link_seq are extracted from the full header), and transmits the IP packet with this header to the next node or a receiver data terminal. In this operation, the decompressed RTP/UDP/IP headers are stored into its internal storage device.

The sender node then converts the RTP/UDP/IP headers in an IP packet b received after the IP packet a into a compressed header, and transmits the packet b with the compressed header to the receiver node (refer to "OP2" in FIG. 12). In the compressed header in the header-compressed packet, a difference value ΔB(=1) between a value [1] in the delta fields B of the packet b and a value [0] in the delta fields B of the last packet a is added, while a value of "1" is set to the flags (flags S, T and I shown in FIG. 11B) that represent changes or non-changes in the difference value.

The receiver node, which received the header-compressed packet b, obtains the delta fields B of the packet b by adding the difference value ΔB notified in this packet to the values of the delta fields B of the RTP/UDP/IP headers of the last IP packet a stored in the internal storage. The receiver node then transmits an IP packet b having both of the RTP/UDP/IP headers, which include the delta fields B and the static fields A of the RTP/UDP/IP headers extracted from the IP packet a, and the RTP payload. The RTP/UDP/IP headers referred in decompressing the IP packet b (in this case, the RTP/UDP/IP headers of the last IP packet a) is specified by the CONTEXT_ID of the header-compressed packet b. The RTP/UDP/IP headers of the IP packet b and the difference value ΔB notified in this packet are also stored in the internal storage.

When next receiving an IP packet c, the sender node calculates a difference value between values of delta fields B of both of the IP packet c and the last IP packet b. The difference value ΔB is [1] (=3−2) in this case, which is the same as the previous one notified to the receiver node last time. Therefore, there is no need to newly notify the receiver node of the unchanged difference value. Hence, the sender node transmits to the receiver node a header-compressed packet c having a compressed header with no difference value (i.e., information shown by the dotted line in FIG. 11B (refer to "OP3" in FIG. 12). The receiver node that received this header-compressed packet c adds the stored difference value ΔB to the delta fields B of the previous packet b, thereby decompressing the delta fields B of this compressed header of the header-compressed packet. Then the receiver node sends an IP packet c composed of both RTP/UDP/IP headers, including the decompressed value and the static fields A extracted from the full header of the full-header packet a, and RTP payload. The next packet d is processed similarly.

The delta fields B of an IP packet e next received by the sender node is [5] in value, of which difference value from the delta fields B of the last IP packet d is [2]. When the difference value ΔB is changed in this way, the sender node transmits a header-compressed packet e having a compressed header in which the changed new difference value is added and the corresponding flag is set to [1]. The receiver node adds the newly notified difference value to the values of the delta fields B of the IP packet d so as to decompress the delta fields B of the packet e, then transmits an IP packet containing the decompressed delta fields B.

The sender node then receives an IP packet g, which is different in the static field A from the last IP packet e. Thus, in this case, the sender node does not compress the RTP/UDP/IP headers of this IP packet and transmits a full-header packet g having a full header in which the lengths in the RTP/UDP/IP headers of the packet g is replaced by the CONTEXT_ID and link_seq. The receiver node that received this full-header packet g converts the full header into the RTP/UDP/IP headers and memorizes them in the internal storage.

The header compression method ruled by the RFC2508 has been described above (hereinafter referred to as a "method A"). However, this compression method has been suffering from some drawbacks, which will be described as follows.

For instance, as shown in FIG. 13, an assumption is made that the header-compressed packet c is lost between the sender and receiver nodes for some reason. As described above, when decompressing the packet d, the receiver node adds the difference value ΔB to the delta fields B of the IP packet c to decompress the delta fields B of the IP packet d. As a result, when the header-compressed packet c is lost, it is impossible to decompress the delta fields B of the header-compressed packet d. The receiver node is therefore forced to discard packets d, e and f shown in FIG. 13, which are received until the next full-header packet g. In other words, the loss of the packets causes consecutive losses of some other packets, which leads to reducing a throughput compared to a method in which the header compression is not involved. In particular, in cases the sender and receiver nodes are connected by a wireless link, a packet is likely to be lost in the wireless link. If such a loss occurs, some other packets are frequently discarded at the receiver node. As a technique to resolve such a problem, the RFC 2507 and 2508 issued by the IETF and the Internet-Draft provide the following methods.

Method 1: Repetitive transmission of full-header packet (RFC 2507)

In the case of the foregoing conventional method A, the sender node transmits a full-header packet only when the static fields of a header change in value. In contrast, as shown in FIG. 14, this method 1 selects several IP packets to be transmitted every predetermined number of packets, regardless of whether the static fields change in value or not. And the selected IP packets are converted to the full header packets with full headers and the full header packets are transmitted to the receiver node, while the remaining IP packets are converted to header-compressed packet with compressed headers and the header-compressed packets are transmitted to the receiver node. In the method A, since full-header packets are not transmitted to the receiver node as long as their static fields do not change in value, all the packets transmitted after the occurrence of loss of a packet are discarded. In contrast, the present method 1 allows a full-header packet to be transmitted at intervals, so that it has the advantage that the number of packets discarded owing to the loss of the packets can be lowered. However, the present method 1 has trade-offs that a longer period for transmitting full-header packets results in that the number of packets discarded is raised, whilst a shorter period for transmitting full-header packets results in that a large number of full-header packets with large overheads are transmitted, reducing efficiency in communication.

Method 2: Request for full headers through back channel (RFC 2507 and 2508)

As shown in FIG. 15, when detecting the loss of a packet, the present method 2 permits the receiver node to transmit a CONTEXT_STATE, a message to request a full-header packet for the sender node. When receiving the CONTEXT_STATE, the sender node transmits the next IP packet to the receiver node in the form of a full-header packet. As a result, an interval during which some packets are discarded due to the loss of a certain packet can be limited to the interval between the occurrence of the packet loss and the reception of a full-header packet transmitted in response to the CONTEXT_STATE. Nevertheless, the present method has a drawback that as the interval between the transmission of the CONTEXT_STATE and the reception of a full-header packet at the receiver node, that is, an RTT (Round Trip Time), becomes larger, the number of packets discarded are also raised. For communicating packets by way of a wireless link, such a drawback becomes noticeable, because the RTT of the wireless link is very long.

Method 3: Twice algorithm (RFC 2507)

According to the present method 3, the compressed headers of header-compressed packets received after the loss of a certain packet are decompressed using the RTP/UDP/IP headers decompressed most lately before the occurrence of loss of the packet. For example, as shown in FIG. 16, it is assumed that after a packet b is received in order, a packet c is lost, and then a packet d is received in order. In this situation, when a difference value ΔB is unchanged in value over the packets b to d, the delta fields B of the packet d can be calculated by adding a value of double ΔB to the delta fields B of the packet b. Moreover, the present method needs the UDP checksum included in a compressed header (refer to FIG. 11B), so that the UDP checksum is used to determine if packets were decompressed correctly. However, as shown in FIG. 16, in cases where a packet k is lost and difference values ΔB of the delta fields between packets j and k change, there is the problem that a packet l received immediately after the packet loss cannot be decompressed correctly. In particular, in the case that packets are communicated via a wireless link, there is a possibility that packets are lost in sequence (namely, over a long interval). Under such a situation, it is considered that difference values ΔB are likely to change for a large number of lost packets. Therefore the foregoing problem is amplified.

Method 4, ROCCO (Internet-Draft)

According to the present method 4, the difference value ΔB can be estimated on a characteristic of a media through which packets are transmitted. For example, in the case of FIG. 17, it is assumed that packets g and h are lost and difference values ΔB between the packets g and h change. In this case, changes in the difference values ΔB are estimated on a characteristic of a media through which packets are transmitted, and a packet can be decompressed through addition of the estimated difference value ΔB to the packet f. Additionally, the present method uses an error detecting code (CRC) to confirm if the decompression is performed correctly or not. Thus, even if the difference value ΔB changes, the present method enables packets received after the loss of a certain packet to be decompressed. However, the present method involves a difficulty in how the difference value ΔB is estimated.

As described above, although a variety of techniques have been proposed to efficiently perform data communication even when RTP/UDP/IP headers of IP packets are compressed, any technique has some drawbacks. Thus, it is a present situation that there is a limitation in effectively reducing the number of packets to be discarded owing to the loss of a certain packet that has been caused between the sender and receiver nodes.

SUMMARY OF THE INVENTION

The present invention has been made in view of the foregoing circumstances. An object of the present invention is to provide a packet transmitting method, a relaying device and a data terminal capable of effectively reducing the number of packets to be discarded due to the loss of a certain packet, even if headers of packets to be transmitted and received are compressed.

According to one aspect of the present invention, an object of the present invention is achieved by a packet transmitting method comprising the steps of a packet transmission by a communication apparatus provided on a transmission node in a network, the packet transmission including an operation for converting a plurality of non-compressed packets to be transmitted into either a full-header packet with a full header or a header-compressed packet with a compressed header and transmitting a converted packet to a receiver node in the network; and a packet reception by a communication apparatus provided on the receiver node, the packet reception including an operation for receiving the full-header packet or the header-compressed packet transmitted from the sender and an conversion for converting a received packet to a decompression packet, the conversion including an operation for keeping, in cases a full-header packet or header-compressed packet is lost during transmission from the sender node to the receiver-node, at least one header-compressed packets received during a period between an occurrence of a packet loss and a reception of a next full-header packet, and an operation for decompressing a compressed header of the header-compressed packets thus kept, based on a content of a full header of the full-header packet received after the packet loss.

In the method, header-compressed packets received until the earliest reception of a full-header packet after the loss of a packet are kept, and the compressed headers of the header-compressed packets thus kept are decompressed based on the contents of the full-header packet. As a result, compared to the foregoing prior art, the number of packets discarded due to the packet loss can be lowered.

The present invention further provides a packet reception method comprising the steps of receiving a full-header packet with a full header or a header-compressed packet with a compressed header and converting a received packet into a decompressed packet; keeping, in cases the full-header packet or header-compressed packet is lost before being received, header-compressed packets received during an interval between the loss of the packet and a reception of a next full-header packet after the loss; and decompressing a compressed header of each of the header-compressed packets kept, based on a content of a compressed header of a full-header packet received after the loss of the packet.

The present invention can be embodied so as to produce or sell the relay apparatuses or the data terminals for transmitting packets in accordance with the packet transmitting method of the present invention. Furthermore, the present invention can be embodied so as to record the program executing the packet reception method of the present invention into storage media readable by computers, and deliver the media to users, or provide the program to users through electronic communication circuits.

BRIEF DESCRIPTION OF THE DRAWINGS

FIG. 11A represents contents of RTP/UDP/IP headers and FIG. 11B represents the contents of a compressed header.

DETAILED DESCRIPTION OF THE INVENTION

Figure 1:
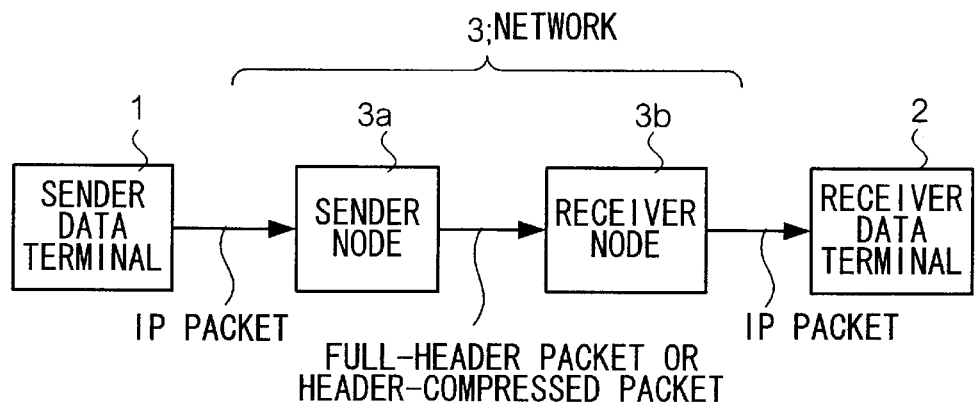
FIG. 1 is a block diagram exemplifying the configuration of a communication system according to a first embodiment of the present invention.

With reference to the accompanying drawings, embodiments of the present invention will now be described. The embodiments, which represent various modes of the present invention, do not mean to limit the scope of the present invention and can be modified within the scopes of the present invention A: First embodiment A-1: Configuration of the first embodiment FIG. 1 is a block diagram pictorially exemplifying a configuration of a communication system into which a packet transmitting method of the present invention can be applied. In the communication system, a sender data terminal 1 and a receiver data terminal 2 are provided so as to exchange packets through a network 3. The present invention is described hereinafter with reference to an example in which the sender terminal 1 sends packets to the receiver terminal 2.

The network 3 includes a sender node 3a and a receiver node 3b. Relay apparatuses are provided on the sender node 3a and receiver node 3b. The relay apparatuses have a function to relay packets which are to be exchanged between the sender and receiver data terminals 1 and 2. Although the network 3 of FIG. 1 exemplifies a configuration including the sender and receiver nodes 3a and 3b, the present invention is not confined to this configuration Three or more nodes and relay apparatuses provided thereon can be included in the network.

In this configuration, the sender data terminal 1 sends in sequence packets destined for the receiver data terminal 2 through the network 3. A packet to be sent from the sender data terminal 1 is an IP packet including RTP/UDP/IP headers shown in FIG. 11A. The relay apparatus on the sender node 3a receives in order IP packets sent from the sender data terminal 1, converts the received IP packets into either full-header packets each including a full header or header-compressed packets each including a compressed header, and sends them to the receiver node 3b. As described before, the full header is a header in which a length value contained in an IP header or UDP header of RTP/UDP/IP headers of an IP packet is replaced by data including a CONTEXT_ID or link_seq. On the other hand, when receiving the header-compressed packet or full-header packet transmitted from the sender node 3a, the relay apparatus on the receiver node 3b restores the RTP/UDP/IP headers from the compressed-header of the header-compressed packet or the full header of the full-header packet, and sends an IP packet including the RTP/UDP/IP headers to the receiver data terminal 2. The receiver data terminal 2 receives an IP packet sent from the receiver node 3*b* and performs predetermined processing (for example, display of images, replay of sound, or the like in accordance with an RTP payload) according to the received IP packet.

Figure 2:
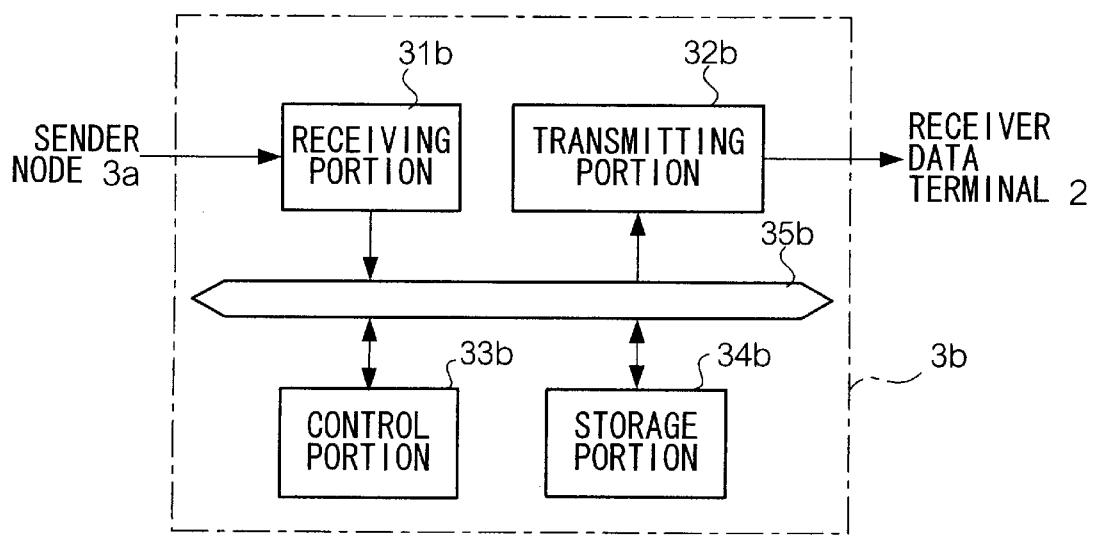
FIG. 2 is a block diagram exemplifying the configuration of a receiver node in the communication system.

Like the conventional technique described before, the full header packet means a packet enabling to restore an IP packet including RTP/UDP/IP headers on the basis of only contents of the full header included in the full-header packet. The length values included in the RTP/UDP/IP headers are replaced by a CONTEXT_STATE and link_seq, however, the length values can be restored with reference to the information on lower layers as well. In contrast, the header-compressed packet means a packet that can be decompressed to an IP packet based on other packets (such as full-header packet), and cannot be decompressed to an IP packet including RTP/UDP/IP headers based only on the compressed header included in the header-compressed packet. Referring to FIG. 2, the relay apparatus provided on the receiver node 3*b* will now be described. As shown in the drawing, the relay apparatus on the receiver node 3*b* includes a receiving portion 31*b*, transmitting portion 32*b*, control portion 33*b*, storage portion 34*b*, and bus 35*b* connecting those units with each other.

The receiving portion 31*b* serves as a means or unit for receiving a full-header packet or header-compressed packet sent from the sender node 3*a* through a communication line and outputting the packet to the control portion 33*b*. The transmitting portion 32*b* serves as a means for transmitting the data output from the control portion 33*b* through a communication line to the reception-data terminal 2.

The control portion 33*b* includes a CPU or other processing unit and functions as means for controlling each unit of the receiver node 3*b* by executing a program stored in the storage portion 34*b*. More specifically, the control portion 33*b* has a function of converting a full-header packet or header-compressed packet received via the receiving portion 31*b* from the sender node 3*a* into an IP packet and transmitting it to the receiver data terminal 2 through the transmitting portion 32*b*. In addition, the control portion 33*b* of the present embodiment is capable of detecting the loss of a packet occurred on the communication path from the sender node 3*a* to the receiver node 3*b*. When the packet loss is detected, the control portion 33*b* is able to transmit a CONTEXT_STATE to request the transmission of a full-header packet to the sender node 3*a*.

By the way, in the foregoing related arts of the present invention, in cases a packet is lost on the communication path from the sender node to the receiver node, the packets which have been received during the interval between the occurrence of packet loss and the reception of the earliest full-header packet after the packet loss occurs. On the contrary, the control portion 33*b* of the relay apparatus on the receiver node 3*b* according to the present invention writes in sequence, into the storage portion 34*b*, header-compressed packets that have been received during an interval between the detection of a packet loss and the reception of the earliest full-header packet after the loss. When receiving a full-header packet after the packet loss, the relay apparatus on the receiver node 3*b* then decompresses the compressed headers of the header-compressed packets stored in the storage portion 34*b* based on the contents of the full header of the received full-header packet so as to produce the original IP packets, and transmits the produced IP packets to the receiver data terminal 2. The processing carried out by the control portion 33*b* will be detailed in operation described later.

The relay apparatus on the sender node 3*a* is configured similarly to the foregoing relay apparatus on the receiver node 3*b*. In other words, the relay apparatus on the sender node 3*a* includes a receiving portion 31*b* for receiving IP packets from the sender data terminal 1, control portion 33*a* for controlling each unit of this node 3*a*, storage portion 34*a*, and transmitting portion 32*a* for transmitting IP packets output from the control portion 33*a* to the receiver node 3*b*. In the present embodiment, however, the control portion 33*a* of the relay apparatus on this node 3*a* transmits, to the receiver node 3*b*, both of, at least the first one of the IP packets transmitted from the sender data terminal 1 as a full-header packet and other IP packets as header-compressed packets. Furthermore, when receiving the CONTEXT_STATE from the receiver node 3*b*, the control portion 33*a* of the relay apparatus on the sender node 3*a* converts an IP packet to be transmitted immediately after the reception into a full-header packet, and transmits the full-header packet to the receiver node 3*b*.

A-2: Operation of first embodiment

Figure 3:
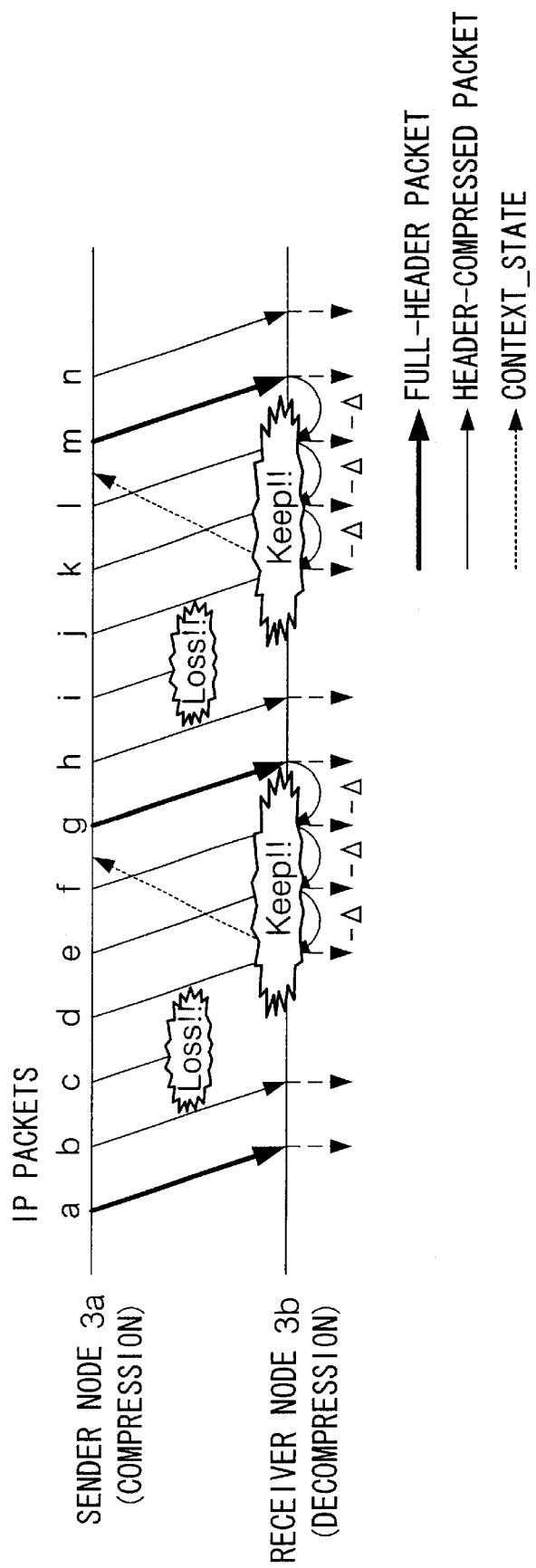
FIG. 3 is a timing chart showing an operation performed by the communication system.

FIG. 3 is a timing chart exemplifying an operation for the packet transmitting method of the present embodiment.

As shown in the drawing, when receiving the first IP packet from the sender data terminal 1, the control portion 33*a* of the relay apparatus on the sender node 3*a* converts the packet a into a full-header packet, and transmits the full-header packet to the receiver node 3*b*. To be more specific, the control portion 33*a* writes the RTP/UDP/IP headers of the IP packet into the storage portion 34*a*, and produces a full header in which length fields included in the RTP/UDP/IP headers are replaced by pieces of information including the CONTEXT_ID and link_seq. The control portion 33*a* then forms a full-header packet a including both of the produced full header and an RTP payload in the IP packet, and sends the full-header packet to the receiver node 3*b*.

Then, when receiving an IP packet b from the sender data terminal 1, the control portion 33*a* converts the IP packet b into a header-compressed packet, and transmits the header-compressed packet to the receiver node 3*b*. Practically, the control portion 33*a* writes the RTP/UDP/IP headers of the IP packet b into the storage portion 34*a* and also calculates difference values between the value in the delta fields of the written RTP/UDP/IP headers of the IP packet b and the value in delta fields of the RTP/UDP/IP headers of the IP packet a stored in the storage portion 34*a*. The control portion 33*a* then produces a compressed header including the calculated difference values, and transmits a header-compressed packet including the produced headers and an RTP payload of the IP packet b.

Then, when receiving an IP packet c from the sender data terminal 1, the control portion 33*a* writes the RTP/UDP/IP headers of the IP packet b into the storage portion 34*a*. Further, the control portion 33*a* calculates difference values between the value in the delta fields of the written RTP/UDP/IP headers of the IP packet c and the value in the delta fields of the RTP/UDP/IP headers of the IP packet b stored in the storage portion 34*a*. The control portion 33*a* determines whether or not the calculated difference values are equal to the difference values stored in the storage portion 34*a* (that is, difference values between the IP packet b and the IP packet a). If determined that both of the difference values are the same, it is unnecessary to again notify the receiver node 3*b* of the difference values. In that case, the control portion 33*a* produces a compressed header excluding the difference values, and transmits a header-compressed packet c including the compressed header to the receiver node 3*b*.

On the other hand, when determined that the foregoing difference values are not equal to the previous ones, it is required to notify the difference values newly calculated this time. Thus, under the operation of the control portion 33*a*, a compressed header including the difference values is produced, and a header-compressed packet that includes the compressed header thus-produced and an RTP payload of the IP packet c is transmitted to the receiver node 3*b*. Additionally, the control portion 33*a* updates the difference values (i.e., the difference values between the IP packets a and b) that have been stored so far in the storage portion 34*a* to the newly obtained difference value of this time.

Hereafter, when receiving IP packets d, e and f sent from the receiver data terminal 1, the identical processing to the IP packet c is carried out for those IP packets, and either a header-compressed packet with difference values or a header-compressed packet without difference values is sent to the receiver node 3*b*.

In the case of an example shown in FIG. 3, a situation is supposed in which the CONTEXT_STATE is received from the receiver node 3*b* immediately before receiving an IP packet g from the sender data terminal 1. In this case, the control portion 33*a* in the sender node 3*a* transmits the IP packet g to be transmitted immediately after the reception of the CONTEXT_STATE, as a full-header packet g. After this, similarly, the control portion 33*a* in the sender node 3*a* transmits packets h to l to the receiver node 3*b*, as header-compressed packets, and a packet m to be transmitted immediately after the reception of the CONTEXT_STATE, as a full-header packet.

On the other hand, when receiving the full-header packet a, the control portion 33*b* in the receiver node 3*b* decompresses RTP/UDP/IP headers from the full header contained in this packet. The control portion 33*b* then transmits the IP packet a with the decompressed RTP/UDP/IP headers to the receiver data terminal 2 and stores those headers into the storage portion 34*b*. Then, when receiving the next header-compressed packet b, the control portion 33*b* refers to the contents of the RTP/UDP/IP headers of the IP packet a, which are stored in the storage portion 34*b*. Through this reference, the control portion 33*b* restores the RTP/UDP/IP headers from the compressed header of the header-compressed packet b, and transmits the IP packet b thus-obtained to the receiver data terminal 2.

FIG. 3 exemplifies a situation in which a header-compressed packet c transmitted from the sender node 3*a* is lost for some reason. In this case, the control portion 33*b* in the receiver node 3*b* receives the next header-compressed packet d transmitted after the lost one c, and recognizes the discontinuity between the link_seq of the packet d and that of the packet b. Thus, this recognition permits the control portion 33*b* to detect the fact that the packet c is lost. When the loss of the packet c is detected, the control portion 33*b* transmits the CONTEXT_STATE to the sender node 3*a*, and writes in order, into the storage portion, 34*b* header-compressed packets received during the interval between the packet loss and the reception of the earliest full-header packet after the loss. In the example of FIG. 3, header-compressed packets d to f are received between the occurrence of loss of the packet c and the reception of a full-header packet g. These header-compressed packets thus received are consecutively written into the storage portion 34*b*.

Figure 4A:
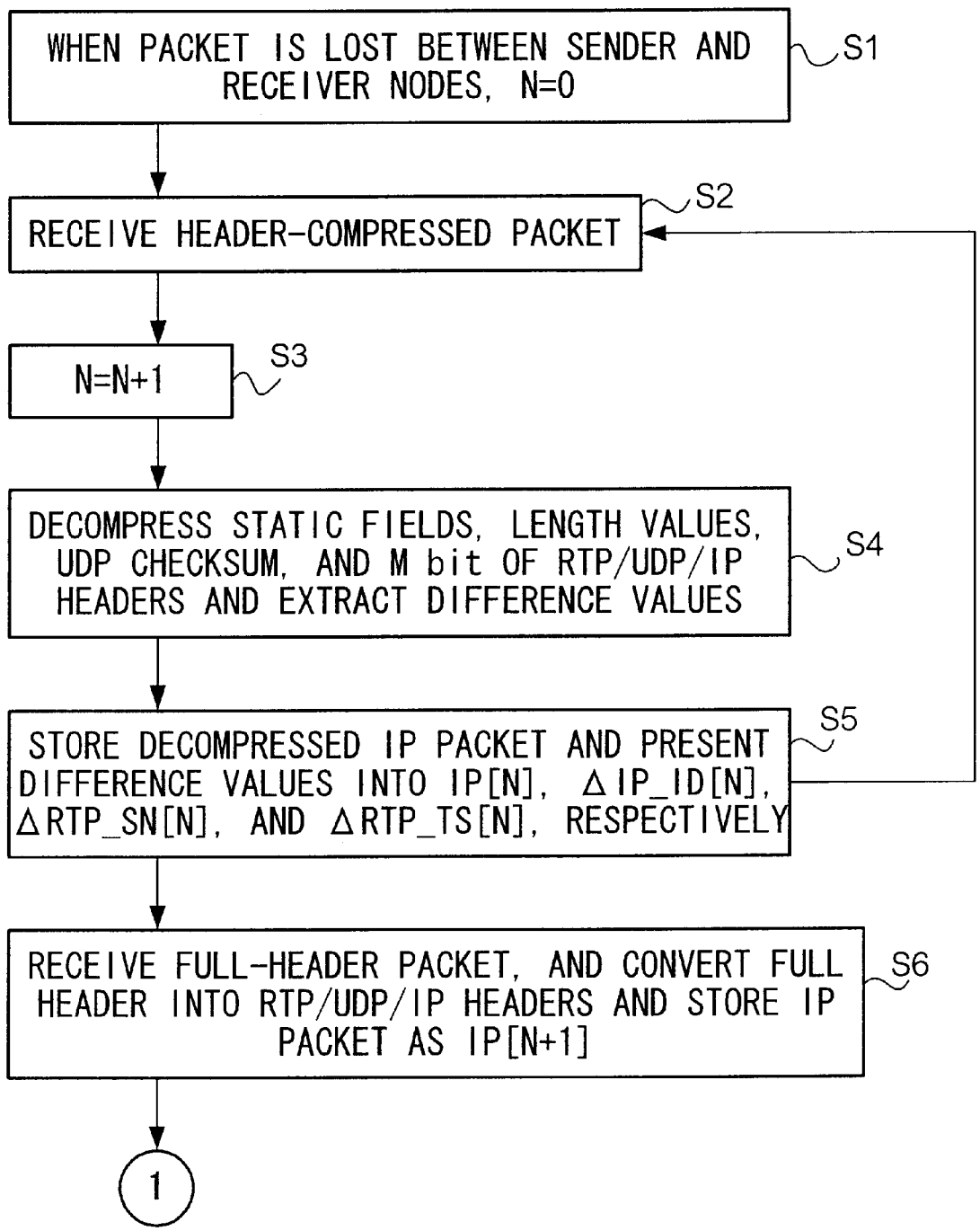
FIGS. 4A and 4B constitute a flowchart showing an operation with packet loss carried out by the receiver node of the communication system.
Figure 4B:
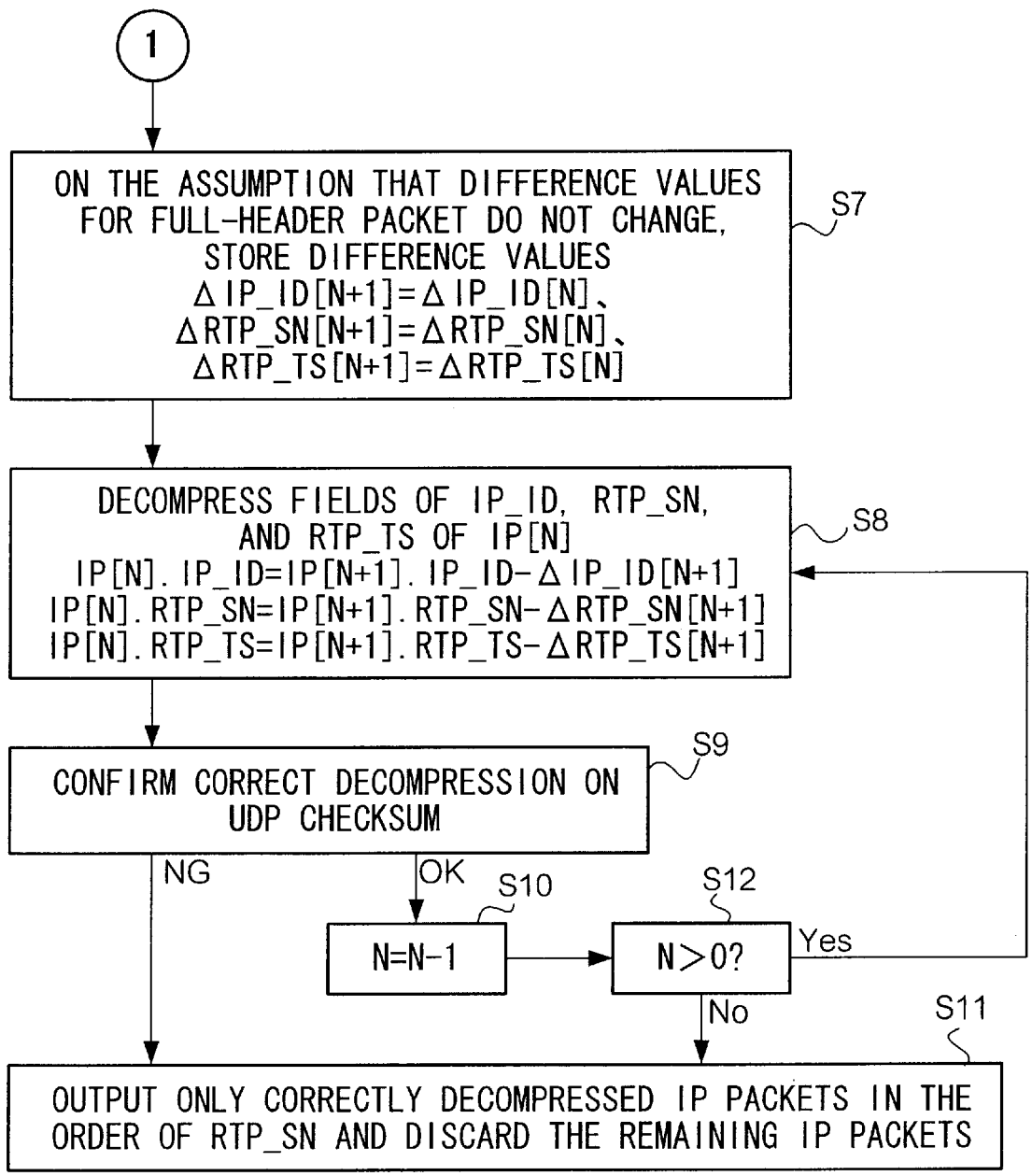

The control portion 33*b* then receives the full-header packet g sent from the sender node 3*a* in response to the CONTEXT_STATE. In the present embodiment, the control portion 33*b* subtracts a difference value Δ, in order, from the values in the delta fields of the full-header packet g, thereby being able to decompress the delta fields of headers of the packets d to f. Practically, as shown in FIG. 3, the subtraction of the difference value Δ from the values in the delta fields of the full-header packet g leads to decompressing contents in the delta fields of the packet f, then the subtraction of the difference value Δ from the decompressed values in the delta fields of the full-header packet f leads to decompressing contents in the delta fields of the packet e, and so on. In the present embodiment, based on the contents of the RTP/UDP/IP headers of the IP packet b stored in the storage portion 34*b*, the contents in the static fields of the packets d to f are decompressed. Therefore, the RTP/UDP/IP headers of the packets d to f are decompressed with respect to the contents. Hereafter, with reference to a flowchart shown in FIGS. 4A and 4B, the processing carried out by the control portion 33*b* of the relay apparatus on the receiver node 3*b* for decompressing the foregoing compression headers will now be described in detail.

Firstly, when detecting the loss of the packet c by means of the lack of the number represented by the link_seq, the control portion 33*b* sets [0] to a register N (Step S1). Then the control portion 33*b* increments the value of the register N by [1] (Step S3).

Then, in the RTP/UDP/IP headers that should be decompressed based on the header-compressed packet d, the control portion 33*b* decompresses the static fields, length values, UDP checksum, and marker bit. In detail, the control portion 33*b* reads the RTP/UDP/IP headers of the IP packet b stored in the storage portion 34*b*, and makes the static fields of the RTP/UDP/IP headers of the packet d so as to be identical to the static fields included in the headers thus read. The UDP checksum and marker bit are included in a compressed header, as illustrated in FIG. 11B. The length values can be obtained by means of the information from the lower layers. In the case that any new difference value is included in the packet d (i.e., in the case that any data enclosed by the dotted line in FIG. 11B is included), the control portion 33*b* extracts the difference value (Step S4).

Then, in the Step S4, the RTP/UDP/IP headers partially decompressed (concerning the static fields or the like) and a content of the RTP payload included in the header-compressed packet d are memorized in the storage portion 34*b* as data IP(1). Further, a present difference value of the ID of the IP header and present difference values of the sequence number and timestamp of the RTP header are written in the storage portion 34*b* as ΔIP_ID(1), ΔRTP_SN(1), and ΔRTP_TS(1), respectively (Step S5). Those present difference values for the ID, sequence number and timestamp are estimated by employing either new difference values if any new difference value is added to the packet d, or, difference values stored in the storage portion 34*b* at present if not contained.

Further, with respect to the header-compressed packets e and f (n=2 to 3) received until the full-header packet g is received, the processing in the Steps S2 to S5 are repeated similarly.

When receiving the full-header packet g, the control portion 33*b* stores the RTP/UDP/IP headers obtained from a full header contained therein as IP(4) into the storage portion 34*b* (Step S6). Then, on the assumption that the difference values unchanged between the packet f and the full-header packet g, the control portion 33*b* determines the difference values of ID, SN and TS between the packet f and the full-header packet g; that is, ΔIP_ID(4), ΔRTP_SN(4), and ΔRTP_TS(4) as the difference values of ID, SN and TS between the packets e and f; that is, ΔIP_ID(3), ΔRTP_SN(3), and ΔRTP_TS(3) (Step S7). In other words, the operations of $$\Delta IP\_ID(4)=\Delta IP\_ID(3),$$

$$\Delta RTP\_SN(4)=\Delta RTP\_SN(3),$$

and $$\Delta RTP\_TS(4)=\Delta RTP\_TS(3)$$

are carried out.

Then, the control portion 33b subtracts, from each value in the delta fields of the full-header packet g, each of the values regarded as the difference values between the packets f and g, i.e., the foregoing $\Delta IP\_ID(4)$, $\Delta RTP\_SN(4)$, and $\Delta RTP\_TS(4)$, thus decompressing contents in the delta fields of the packet f (Step S8). More specifically, with respect to the packet f, values in the ID of the IP header and the sequence number (SN) and timestamp (TS) of the RTP header, which are the targets to be decompressed, are expressed by IP(3).IP_ID, IP(3).RTP_SN, and IP(3).RTP_TS, respectively, while with respect to packet g, values in the ID of the IP header and the sequence number (SN) and timestamp (TS) of the RTP header are expressed by IP(4).IP_ID, IP(4).RTP_SN, and IP(4).RTP_TS, respectively. The contents of the delta fields of the packet f can be decompressed by calculation shown below.

$$IP(3).IP\_ID=IP(4).IP\_ID-\Delta IP\_ID(4)$$

$$IP(3).RTP\_SN=IP(4).RTR\_SN-\Delta RTP\_SN(4)$$

$$IP(3).RTP\_TS=IP(4).RTR\_TS-\Delta RTP\_TS(4)$$

After the RTP/UDP/IP headers of the packet f have been decompressed, the control portion 33b proceeds to determine if the decompressed results are correct or not, using the UDP checksum included in the packet f (Step S9). When the determination is that the decompressed results are correct, the value of the register N is decremented by [1] (Step S10). Then, the packets e and d are also subjected to the same processing as in the Steps S8 and S9.

On the other hand, when it is determined in the Step S9 that the decompressed results are not correct, the processing is stopped immediately, and forwarded to Step S11, because it is impossible to correctly decompress the packets received before the packets f. In addition, when the decrement of N by [1] in Sep S11 results in N=0(Step S12), it is meant that the decompression of all the packets to be decompressed have been completed. Accordingly the processing proceeds to Step S11.

In the Step S11, the control portion 33b transmits in sequence each of the packets decompressed correctly to the receiver data terminal 2 in the order of the sequence number of the RTP header included in each packet. In contrast, packets which were not decompressed correctly are discarded.

The communication system of the present embodiment operates in this way.

As described above, in the packet transmitting method of the present embodiment, header-compressed packets received after the occurrence of loss of a packet are stored, and their headers are decompressed on the basis of the contents of a next full-header packet received after the loss. In contrast, in the case of each conventional method described before, there was a problem in which some packets received during the interval between the occurrence of a packet loss and the reception of the earliest full-header packet after the loss should had been discarded, even if those packets were properly received. The present embodiment improves this point such that some packets received during such an interval can be utilized effectively. Compared to the related art of the present invention, the influence of the packet loss on data replay or the like at the receiver data terminal can be lessened.

A-3: Variation of first embodiment

Figure 5A:
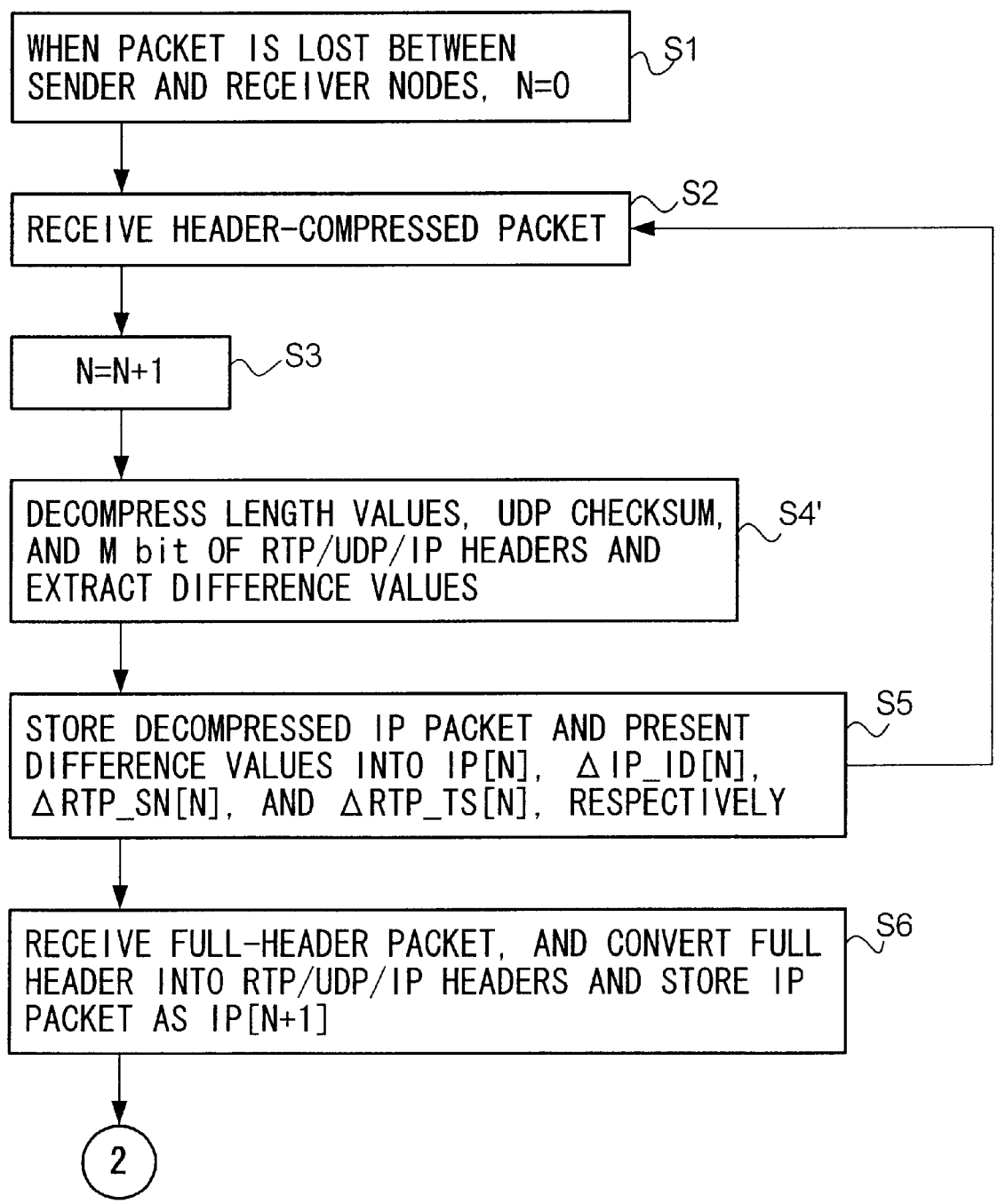
FIGS. 5A and 5B constitute a flowchart showing an operation with packet loss carried out in a variation of the first embodiment
Figure 5B:
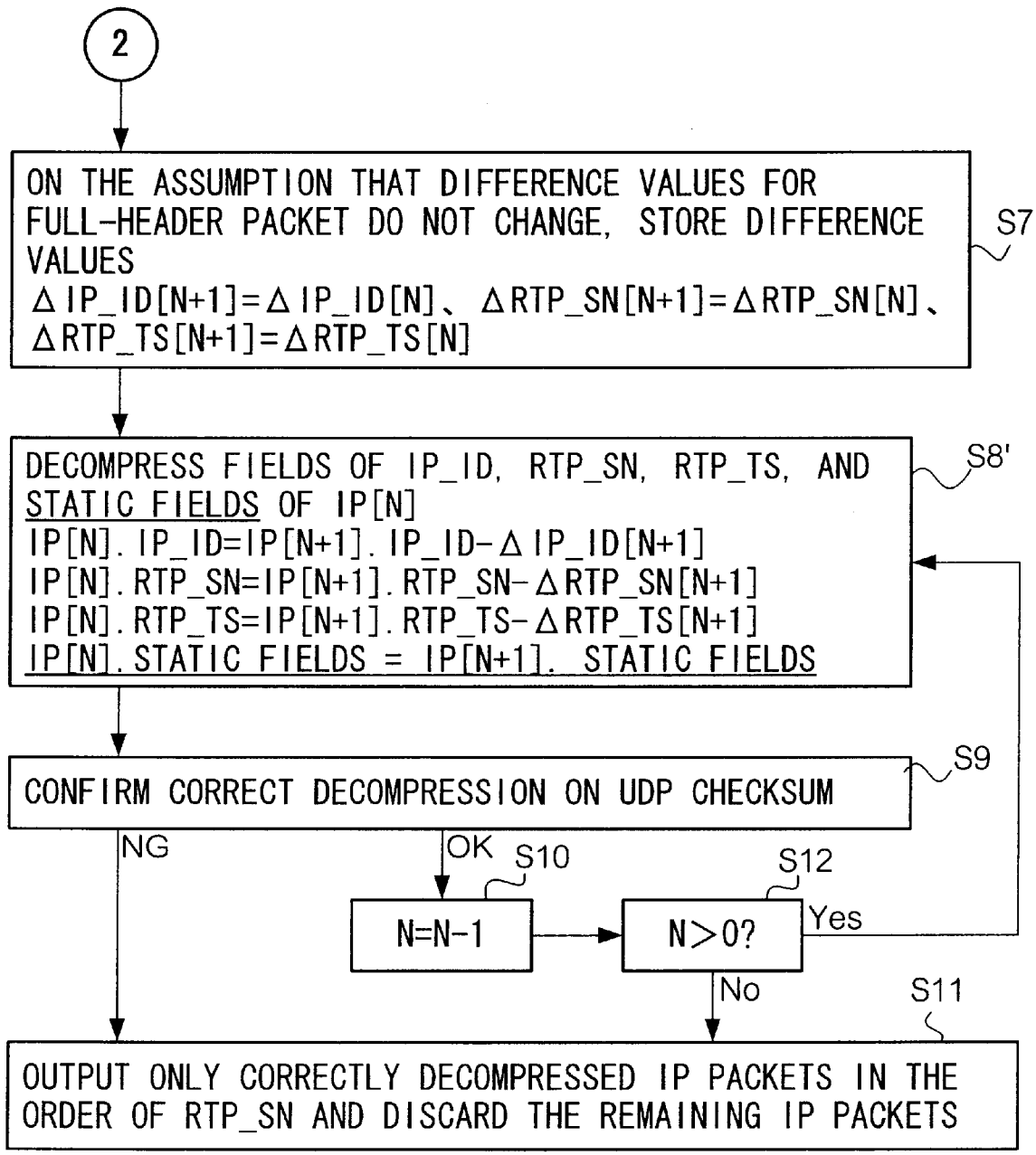

The foregoing first embodiment has been constructed such that the static fields of the packets d to f received during the interval from the occurrence of loss of the packet c to the reception of the earliest full-header packet g after the loss are decompressed according to the contents of the RTP/UDP/IP headers of the IP packet b received before the loss of the packet c. However, the decompression is not limited to such a construction. For example, the static fields of those packets d to f may be decompressed on the contents of the full-header packet g that will be received most early. FIGS. 5A and 5B constitute a flowchart showing an operation of packet decompression in the present variation. This flowchart is the same as that shown in FIGS. 4A and 4B except that the static fields of each packet which should be decompressed are decompressed based on the contents of the full-header packet g received after packets to be decompressed. Hence, only different configurations from FIGS. 4A and 4B will be described below.

In the first embodiment, the processing is performed in the Step S4 such that information about the static fields of the header-compressed packets received after the packet loss are decompressed using the static fields of the RTP/UDP/IP headers of the IP packets b already received and stored in the storage portion 34b. However, in the present variation, the static fields are not decompressed in Step S4'. In other words, only the length values, UDP checksum, and marker bit M are decompressed. Therefore, in the next Step S5, those stored into the storage portion 34b as an IP(N) are packets each having both of RTP/UDP/IP headers with the static fields and deltas fields excluded, and an RTP payload of the header-compressed packet received this time.

In addition, the static fields of packets to be decompressed are decompressed based on the contents of the full-header packet g. More specifically, as underlined in Step S8' in FIGS. 5A and 5B, the static fields of packets to be decompressed are regarded as being the same in contents as those of the full-header packet received immediately after those packets. For example, supposing that the above-mentioned process is explained using the situation as shown in FIG. 3 as an example, the contents of static fields of the packet f are decompressed on the assumption that the static fields of the packet f are the same in contents as those of the full-header packet g received immediately after the packet f. Also, the contents of static fields of the packet e are decompressed on the assumption that the static fields of the packet e are the same in contents as those of the packet f thus decompressed.

Also in this variation, eventually, the UDP checksum is used to determine whether the decompression is made correctly or not. Only the packets which have been correctly decompressed are sent to the receiver data terminal. Accordingly, the present variation is able to provide the identical advantage to that of the first embodiment.

B: Second embodiment

B-1: Configuration of second embodiment

In each embodiment described above, by the receiver node 3b of the network 3, header-compressed packets received after the occurrence of a packet loss are kept, and the kept header-compressed packets are decompressed in contents on the basis of the contents of a full-header packet received after the packet loss. In the above-mentioned case, however, the decompression is carried out on the assumption that the delta fields of the full-header packet received after the packet loss is unchanged in difference values from those of a header-compressed packet immediately before the full-header packet (refer to Step S7 in FIG. 4B). This means that if the difference value is changed, there is caused a problem in which the kept header-compressed packets are no longer correctly decompressed. The present embodiment relates to a packet relaying method which is able to solve of the problem.

In the present embodiment, the communication system, as well as the relay apparatuses on the sender node 3a and receiver node 3b are identical to those shown in FIGS. 1 and 2. However, there is a difference in types of packets sent from the sender node 3a to the receiver node 3b between the foregoing embodiment and the present embodiment. More specifically, in the foregoing embodiment, full-header packets and header-compressed packets are sent, while in the present embodiment, full-header packets with difference values added in a particular case are also sent, in addition to full-header packets and header-compressed packets. Practically, in cases that an IP packet received from the sender data terminal 1 should be transmitted as a full-header packet, and that difference values between the delta fields of the IP packet and those of the previous IP packet received immediately before the IP packet are different from difference the values stored in the storage portion 34a (i.e., the difference values are changed), the sender node 3a transmits a full-header packet including the new difference values to the receiver node 3b.

Figure 6B:
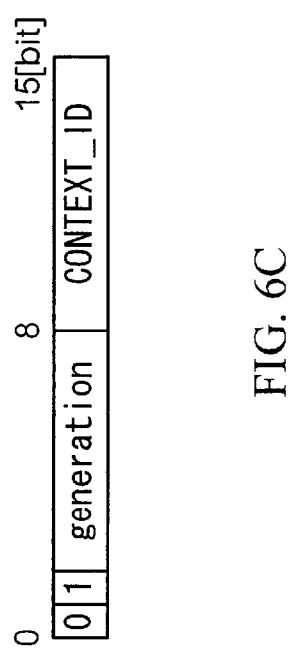
FIGS. 6A, 6B and 6C show the configuration of a full header used in a second embodiment of the present invention.
Figure 6C:
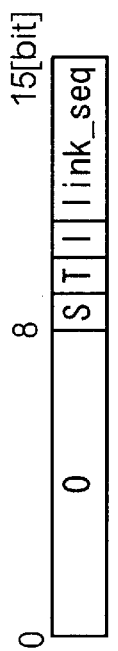
Figure 6A:
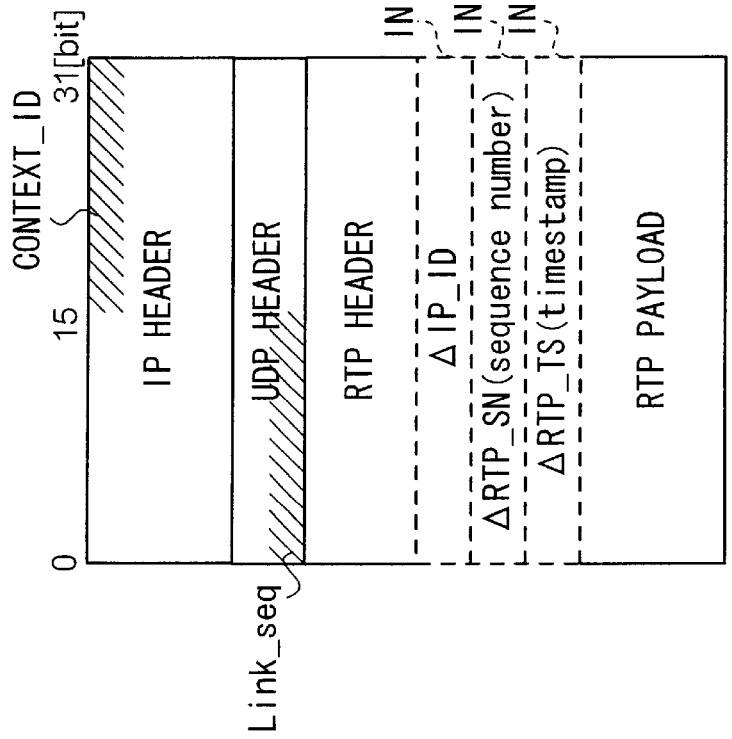

FIG. 6A pictorially shows the contents of a full-header packet with difference values. As shown by the dotted line therein, if any of the delta fields of RTP/UDP/IP headers is changed (namely, any of the ID of the IP header and the sequence number and timestamp of the RTP header is changed), the full-header packet includes the new difference value. Like the foregoing embodiments, the full header of the full-header packet is made by inserting the CONTEXT_ID and link_seq into the length fields of IP and UDP headers (portions with hatching in FIG. 6A). In addition, as shown in FIGS. 6B and 6C, the full-header packet with the difference values includes flags S, T and I as well as the CONTEXT_ID and link_seq. Each flag shows whether each delta field is subjected to change to a difference value. For example, when a difference value for the sequence number of the RTP header is changed, the new difference value ΔRTP_SN is added to the header, as shown by the dotted line in FIG. 6A, and "1" is set in the flag S. When a difference value for the ID of the IP header is changed, the new difference value ΔIP_ID is added to the header, and "1" is set in the flag I. Also, when a difference value for the timestamp of the RTP header is changed, the new difference value ΔRTP_TS is added to the header, and "1" is set in the flag T. When receiving a full-header packet into which the difference values are added, the receiver node 3b examines the flags to detect any change of the delta fields (IP ID, sequence number, and timestamp). This operation enables the node 3b to obtain a new difference value between the full-header packet and its previous packet.

B-2: Operation of second embodiment

Figure 7:
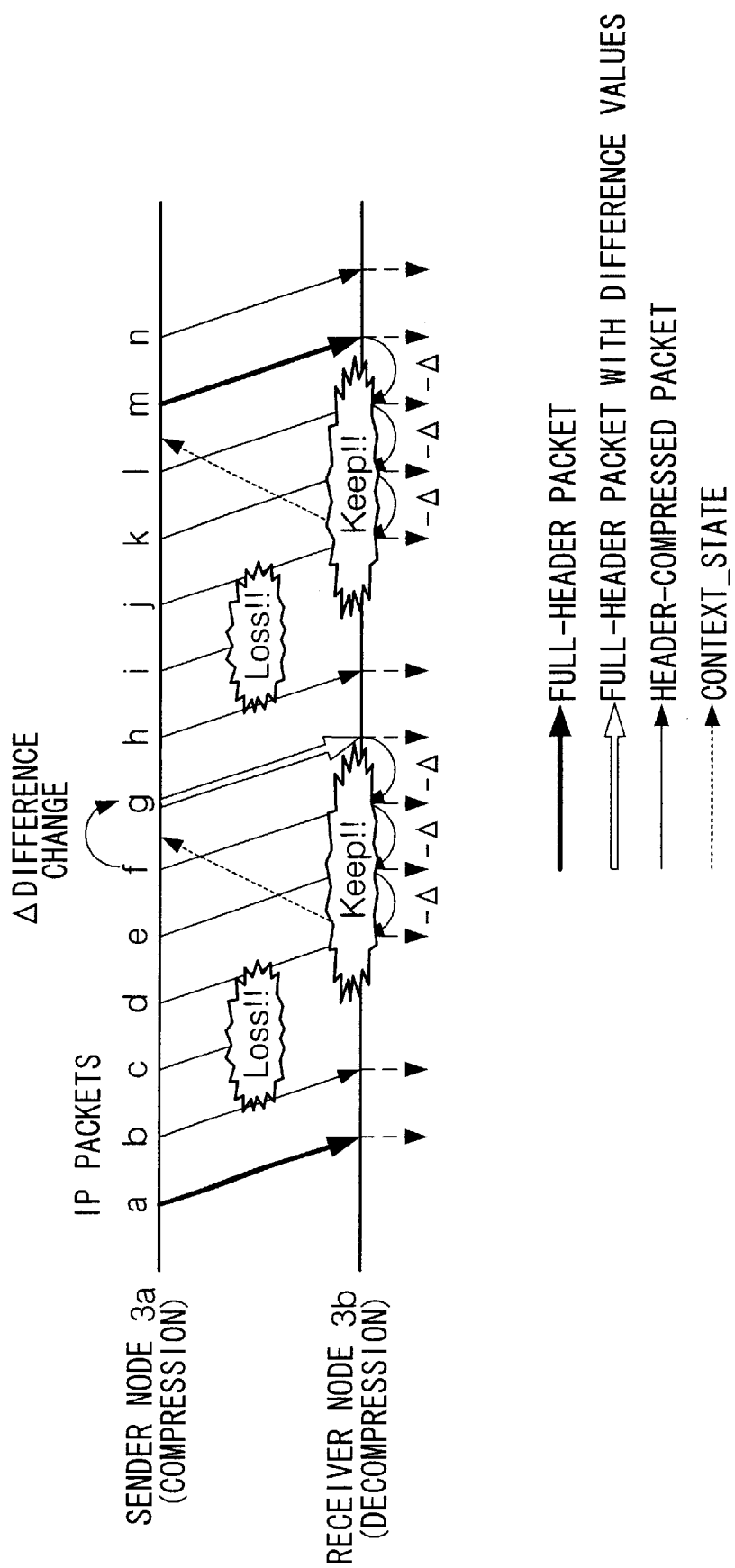
FIG. 7 is a timing chart showing an operation performed by the communication system.

Referring to FIG. 7, an operation of the present embodiment will now be described. Like the first embodiment, a case is exemplified where the sender node 3a transmits to the receiver node 3b an IP packet processed into a full-header packet, in response to receiving the CONTEXT_STATE from the receiver node 3b.

IP packets a to f sent from the sender data terminal 1 are received in order by the sender node 3a. The control portion 33a of the node 3a sends to the receiver node 3b the first IP packet a as a full-header packet, and sends to the node 3b the IP packets b and c as header-compressed packets. These operations are identical to those described in the first embodiment, so they are omitted from being explained in detail.

In FIG. 7, a situation is given in which the control portion 33a of the sender node 3a receives the CONTEXT_STATE from the receiver nod 3b, immediately before receiving an IP packet g from the sender data terminal 1. In response to the reception, the control portion 33a transmits to the receiver node 3b an IP packet g received from the sender data terminal 1 immediately after receiving the CONTEXT_STATE, as a full-header packet with no difference value or with difference values. Practical procedures are as follows.

First, the control portion 33a writes the RTP/UDP/IP headers of the IP packet g received this time into the storage portion 34a. And the control portion 33a obtains the difference values between the values included in the delta fields of the RTP/UDP/IP headers and those of RTP/UDP/IP headers stored in the storage portion 34a (the headers of the IP packet f). The control portion 33a then determines if or not the obtained difference values equal those stored in the storage portion 34a. When the obtained difference values are equal to those stored ones, it is not required to notify the receiver node 3b of the difference values obtained this time, because they have already been given the node 3b. Accordingly, the control portion 33a produces a full header in which the lengths in the RTP/UDP/IP headers of the IP packet g are replaced by information including the CONTEXT_ID and link_seq. The control portion 33a then sends the full-header packet g including both the produced full header and an RTP payload of the IP packet g to the receiver node 3a.

In contrast, when the obtained difference values are unequal to those stored ones, the control portion 33a sends a full-header packet with the difference values to the receiver node 3b, so that the difference values obtained this time is notified to the node 3b. This operation can be explained in detail as follows. The control portion 33a replaces the lengths written in the RTP/UDP/IP headers of the IP packet g with data including the CONTEXT_ID, link_seq, and any flag to indicate the existence of the new difference values of the corresponding delta fields (refer to FIG. 6C). The control portion 33a then produces a full header including any new difference values (corresponding to any section shown by the dotted line in FIG. 6A), and sends the full-header packet g including the produced full header and an RTP payload of the IP packet g to the receiver node 3b. FIG. 7 shows an example in which there is a change in difference values between the delta fields of both IP packets f and g, and the IP packet g is transmitted as a full-header packet g including difference values.

For the case receiving IP packets h to n in succession from the sender data terminal 1, processing is repeated similarly to the above. That is, either header-compressed packets or full-header packets, with no difference value or with difference values, are appropriately sent from the sender node 3a to the receiver node 3b.

When the control portion 33b of the receiver node 3b receives packets from the sender node 3a as described above, the control portion 33b operates as follows.

Firstly, when receiving the first full-header packet a sent from the sender node, the control portion 33b extracts information, such as the CONTEXT_ID and link_seq, from the full header of the packet a, and writes the information into the storage portion 34b. Additionally the control portion 33b replaces those pieces of information in the full header with lengths obtained from the lower layers, and decompresses the RTP/UDP/IP headers of the packet a. The control portion 33b then writes the RTP/UDP/IP headers into the storage portion 34b in correspondence to the previously stored the CONTEXT_ID and link_seq, and sends an IP packet a with the RTP/UDP/IP headers to the receiver data terminal 2.

Then, when receiving the header-compressed packet b from the receiver node 3a, the control portion 33b writes the difference values included in the header-compressed packet b into the storage portion 34b. The control portion 33b searches the same CONTEXT_ID as that included in a compressed header of the packet b from the storage portion 34b, and reads RTP/UDP/IP headers (in this case, the RTP/UDP/IP headers of the packet a) corresponding to the searched CONTEXT_ID. The control portion 33b then produces RTP/UDP/IP headers and sets them in the delta fields of the read RTP/UDP/IP headers, the thus-produced RTP/UDP/IP headers including the delta fields to which the difference values obtained this time are added and the static fields of the RTP/UDP/IP headers of the IP packet a. Then, the control portion 33b updates the RTP/UDP/IP headers of the IP packet a already stored in the storage portion 34b into the RTP/UDP/IP headers newly obtained this time, and sends an IP packet b with the updated RTP/UDP/IP headers to the receiver data terminal 2.

Figure 8A:
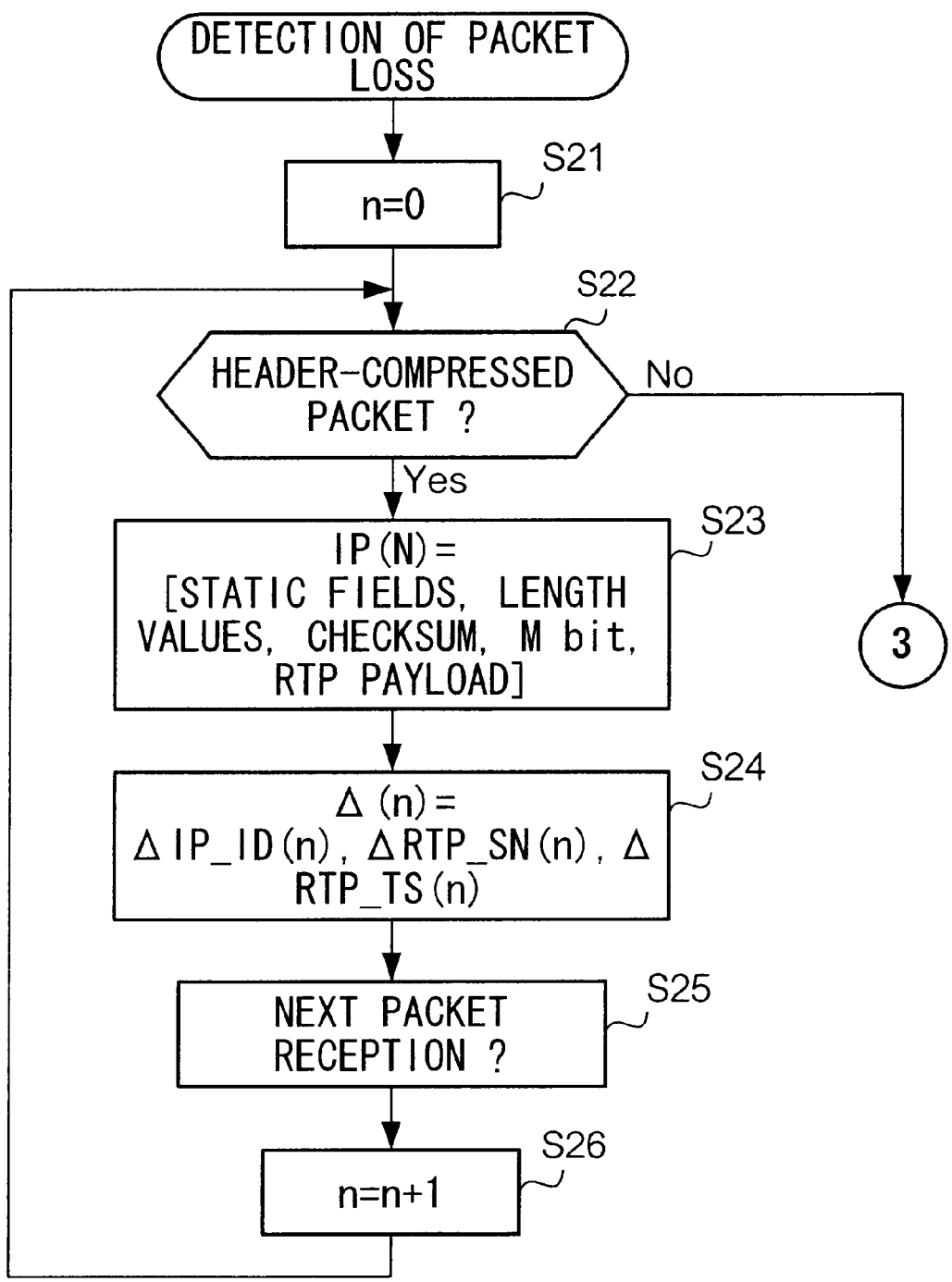
FIGS. 8A and 8B constitute a flowchart showing an operation with packet loss carried out by the relay apparatus on the receiver node of the communication system.
Figure 8B:
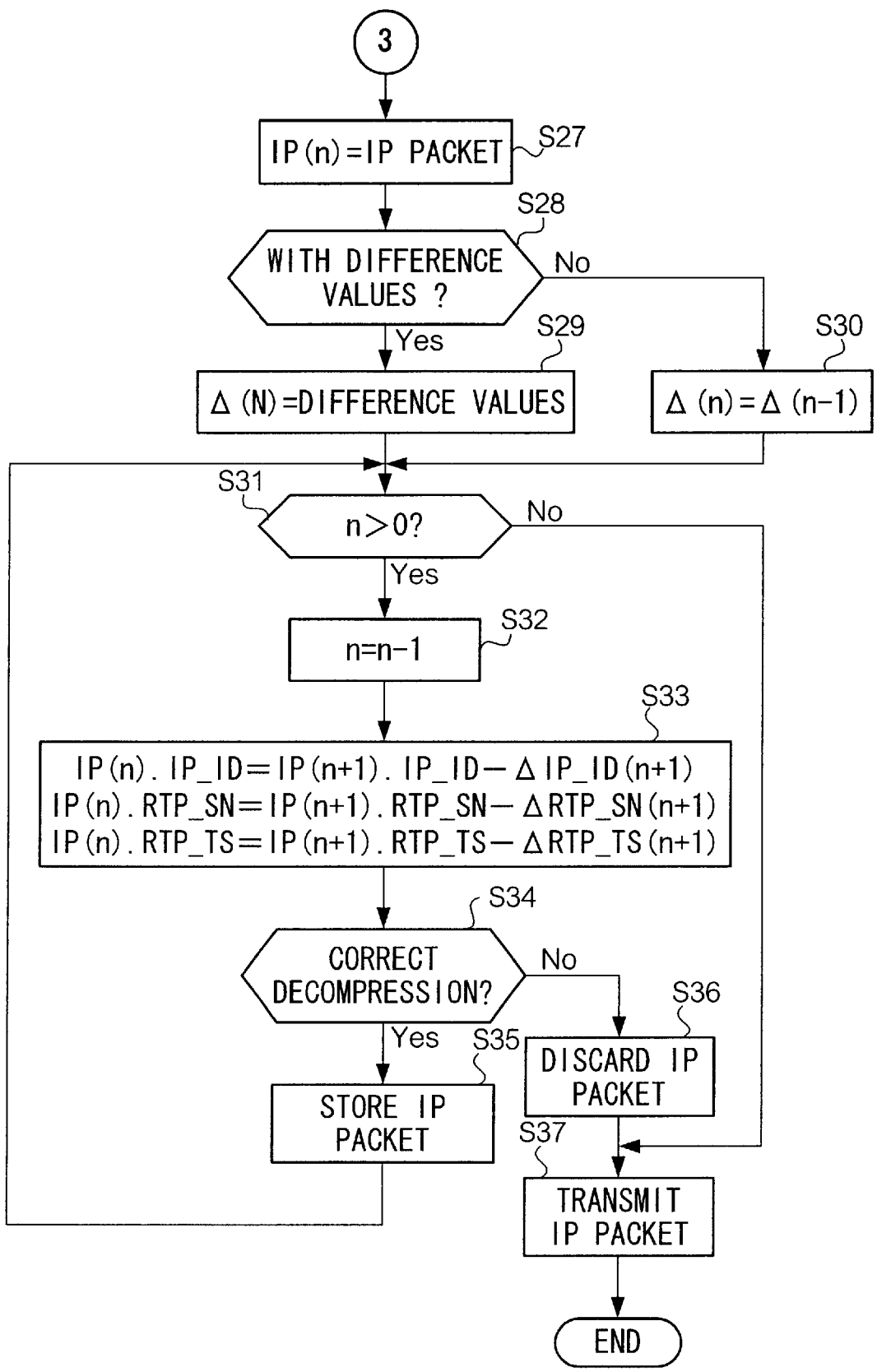

The case shown in FIG. 7 exemplifies a situation where a header-compressed packet c delivered from the sender node 3a is lost for some reason. Thus the control portion 33b of the receiver node 3b detects the loss of the header-compressed packet c due to discontinuity between the link_seq of the header-compressed packet d and that of the header-compressed packet b. Referring to the flowchart shown in FIGS. 8A and 8B, an operation carried out by the control portion 33b in response to the detection of the packet loss will be now described.

The control portion 33b first sets [0] to a register n (Step S21), and determines if the latest packet received after the loss (that is, the next packet to the lost packet) is a header-compressed packet or not (Step S22). In the case shown in FIG. 7, a packet received immediately after the packet loss is a header-compressed packet d, so the determination is "YES." The control portion 33b then decompresses the static fields, length values, UDP checksum, and marker bit (M bit) of this packet-compressed packet d, and memorizes both the decompressed information and an RTP payload of the header-compressed packet d received this time into the storage portion 34b as data IP(n) (Step S23). In other words, fields other than the delta fields in the IP packet d are memorized in the storage portion 34b as data IP(0). This decompression may be performed in the similar manner to that in the first embodiment.

The control portion 33b then memorizes the present difference values in the different-constant fields, that is, a difference value of ID of the IP header, a difference value of the sequence number of the RTP header, and a difference value of timestamp of the RTP header into the storage portion 34b, as ΔIP_ID(n), ΔRTP_SN(n), and ΔRTP_TS (n) (hereinafter, generalized as "Δ(n)"), respectively (Step S24). If the header-compressed packet received this time has new difference values, those new ones provide the present difference values, while if the header-compressed packet received this time has no difference values, difference values stored in the storage portion 34b at that time provide the present difference values.

When receiving the next packet (Step S25), the control portion 33b increments the value of the register n by [1] (Step S26). The foregoing procedures of Steps S22 to S26 are performed when receiving the header-compressed packets e and f. As a result, with respect to the header-compressed packets d to f, pieces of information shown in FIG. 9 (that is, IP(n) and Δ(n)) are stored in the storage portion 34b.

Figure 9:
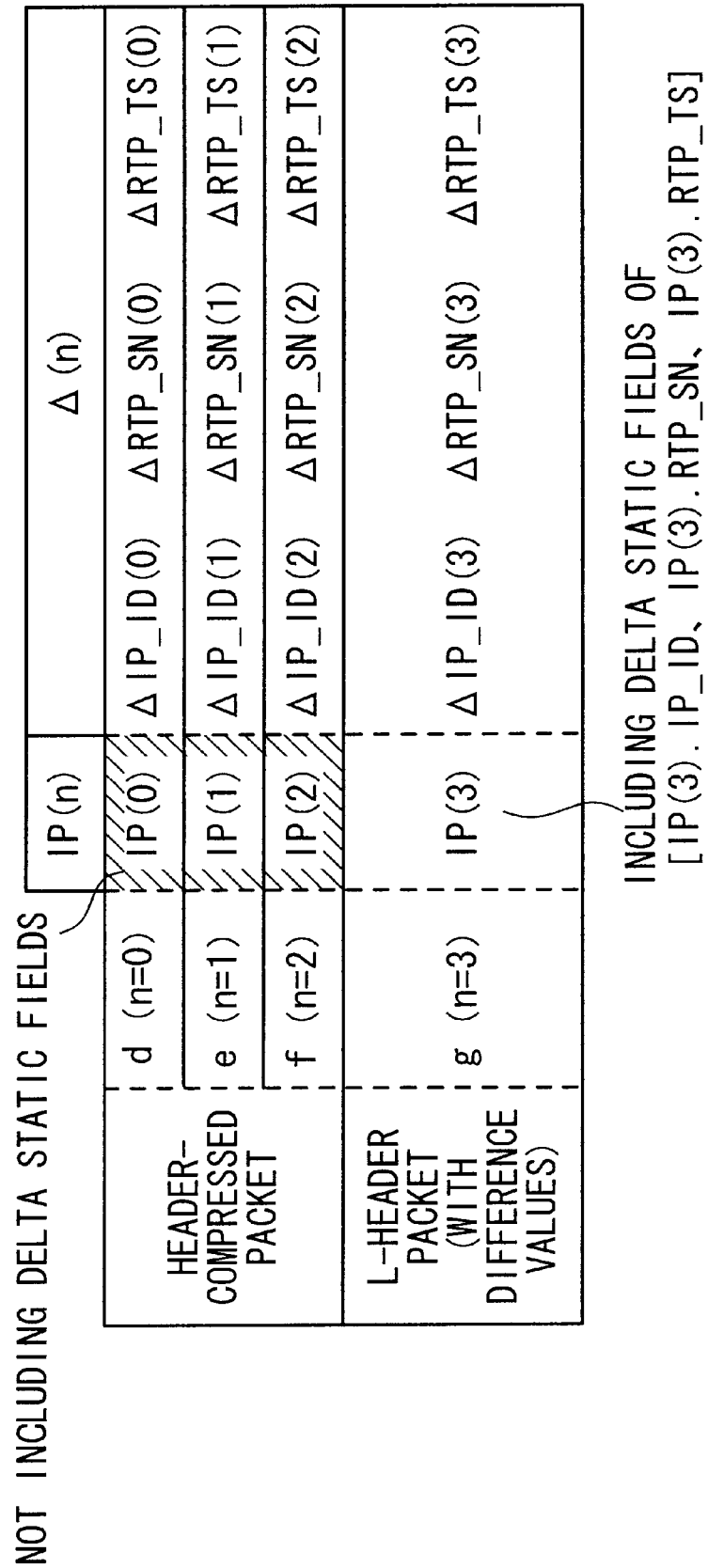
FIG. 9 shows an illustration exemplifying a memorized content of storage in the receiver node in the case that a packet is lost in the communication system.

On the other hand, when receiving a full-header packet at Step S25, the determination in the following Step S22 becomes "NO," thus being forced to go to Step S27. Namely the control portion 33b produces RTP/UDP/IP headers by replacing the CONTEXT_ID, link_seq, and others included in the full header of the received full-header packet g with lengths, and produces an IP packet that consists of the produced RTP/UDP/IP headers and an RTP payload of the full-header packet received this time. The obtained IP packet is then memorized in the storage portion 34b as IP(3) (Step S27). As shown in FIG. 9, the RTP/UDP/IP headers of the IP packet (i.e., IP(3)) obtained from the full-header packet include values in the delta fields (i.e., the ID, sequence number and timestamp).

The control portion 33b then stores a difference value in each delta field between the full-header packet and the header-compressed packet received before the full-header packet into the storage portion 34b as Δ(n). In the example of FIG. 7, this storage can be explained as follows. The control portion 33b determines if the full-header packet g received this time includes new difference values or not (Step S28). Those new difference values are illustrated by the dotted line in FIG. 6A If at least one of the delta field includes a new difference value, the new difference value for the corresponding delta field and the difference values already stored in the storage portion 34b for the other delta fields are memorized into the storage portion 34b, as Δ(3) (Step S29). In contrast, if the full-header packet g does not include any new difference value, the difference values already stored in the storage portion 34b are memorized again into the storage portion 34b, as Δ(3) (Step S30).

According to the above operations, the information with respect to the packets d to g are mapped in the storage portion 34b, as shown in FIG. 9. At this stage, the IP packet g mapped as IP(3) includes the delta fields, but the IP packets d to f mapped as IP(0) to IP(2) do not include such delta fields. Thus, the procedures to recover those delta fields are then carried out in the following way.

Firstly, the control portion 33b decrements a value of the register n by "1" (Step S32). The control portion 33b then subtracts the difference values obtained above from the values in the delta fields of the RTP/UDP/IP headers decompressed from the full-header packet, thereby decompressing the delta fields of the header-compressed packet received immediately before the full-header packet (Step S33). In the example of FIG. 7, the difference value in each delta field mapped as Δ(3) is subtracted from each value in each delta field included in the IP(3) stored in the contents of the full-header packet g, which decompresses the delta fields of the header-compressed packet f. Practically, when taking values of the ID, sequence number, and timestamp each included in the IP(3) as IP(3).IP_ID, IP(3).RTP_SN, and IP(3).RTP_TS, respectively, values IP(2).IP_ID, IP(2).RTP_SN, and IP(2).RTP_TS of the delta fields of the header-compressed packet f are obtained by calculating the following equations (refer to FIG. 9).

IP(2).IP_ID=IP(3).IP_ID-IP_ID(3)

IP(2).RTP_SN=IP(3).RTP_SN-ΔRTP_SN(3)

IP(2).RTP_TS=IP(3).RTP_TS-ΔRTP_TS(3)

When the values of the delta fields have been decompressed, the control portion 33b combines the decompressed delta fields and the other fields stored in the storage as IP(2), thus producing an IP packet f. The control portion 33b then determines if the decompression has been done correctly or not by using the UDP checksum included in the IP packet f (Step S34). When determined that the correct determination was made, the control portion 33b memorizes the IP packet f into the storage portion 34b (Step S35). Further, the control portion 33b repeats the similar procedures shown in Step S32 to S35 so as to decompress the delta fields of the remaining header-compressed packets e and d.

When the value of the register n becomes [0] at Step S31, it is meant that the decompression of all the header-compressed packets that have been memorized was completed. In this case, the IP packets (including IP packets obtained from the full-header packet) that have been memorized in the storage portion 34b so far are sent sequentially to the receiver data terminal 2 in the order of the sequence number in the RTP header.

In contrast, if it is determined that the decompression was not made correctly, it is considered that header-compressed packets received prior to the incorrectly decompressed packet will not also be decompressed correctly. Accordingly, all IP packets remained to be decompressed are discarded (Step S36), whilst only IP packets that have been decompressed correctly are sent to the receiver data terminal 2 (Step S37).

In the present embodiment, the operation is given as above.

According to the present embodiment, for changes in the difference values, the difference values are added to full-header packets as well as header-compressed packets, and the packets with the difference values are sent. Therefore, even when difference values are changed between an IP packet to be transmitted as a full-header packet and its previous IP packet (header-compressed packet), the receiver node 3b is able to correctly decompress the contents of the header-compressed packet.

C: Third embodiment

In each of the foregoing embodiments, the sequential subtraction of the difference values concerning a header-compressed packet received after a packet loss from the values in the delta fields of a full-header packet received most early after the packet loss enables the header-compressed packets stored to be decompressed into IP packets. However, the technique of decompressing header-compressed packets based on a full-header packet received after the packet loss is not restricted to that described in the foregoing embodiments. A third embodiment that will be described herein relates to one example of such techniques. In the following explanation, only the configurations different from those in the foregoing embodiments will now be described.

In the foregoing embodiments, in cases that difference values in the delta fields of an IP packet are changed, the sender node 3a operates to include the new difference values into the compressed header of a header-compressed packet. In contrast, in the present embodiment, instead of the difference values, some lower bits hereinafter, referred to as "LSBs (least significant bits)") of each delta field are included in the compressed header of a header-compressed packet.

Specifically, when receiving a certain IP packet, which should be sent as a header-compressed packet, from the sender data terminal 1, the sender node 3a computes difference values between the values in the delta fields of the certain IP packet and those of the IP packet (which was received just before the certain IP packet) stored in the storage portion 34a. And the node 3a compares the computed difference values with the difference values stored in the storage. If any of the difference value of the delta fields is changed, the control portion 33a of the sender node 3a extracts LSBs from the corresponding delta field of the IP packet received this time. And the control portion 33a produces a compressed header including both the LSBs and the corresponding flag in which "1" is set to indicate the existence of the LSBs. Any of the flags S, T and I in FIG. 11B may be used for this purpose. The control portion 33a sends a header-compressed packet with this compressed header to the receiver node 3b. On the other hand, if the foregoing comparison reveals that the difference values between the computed difference values and the difference values stored in the storage are coincided with each other, the LSBs are not included in the header-compressed packet decompressed from the IP packet received this time.

The number of bis transmitted as the LSBs depends on the characteristics of data to be transmitted and delta fields (of the ID, sequence number, and timestamp) and the like, and selected according to those conditions. For instance, the upper bits which are not expected to change are excluded, and the remaining lower bits are transmitted to indicate the change of the corresponding delta field.

Figure 10:
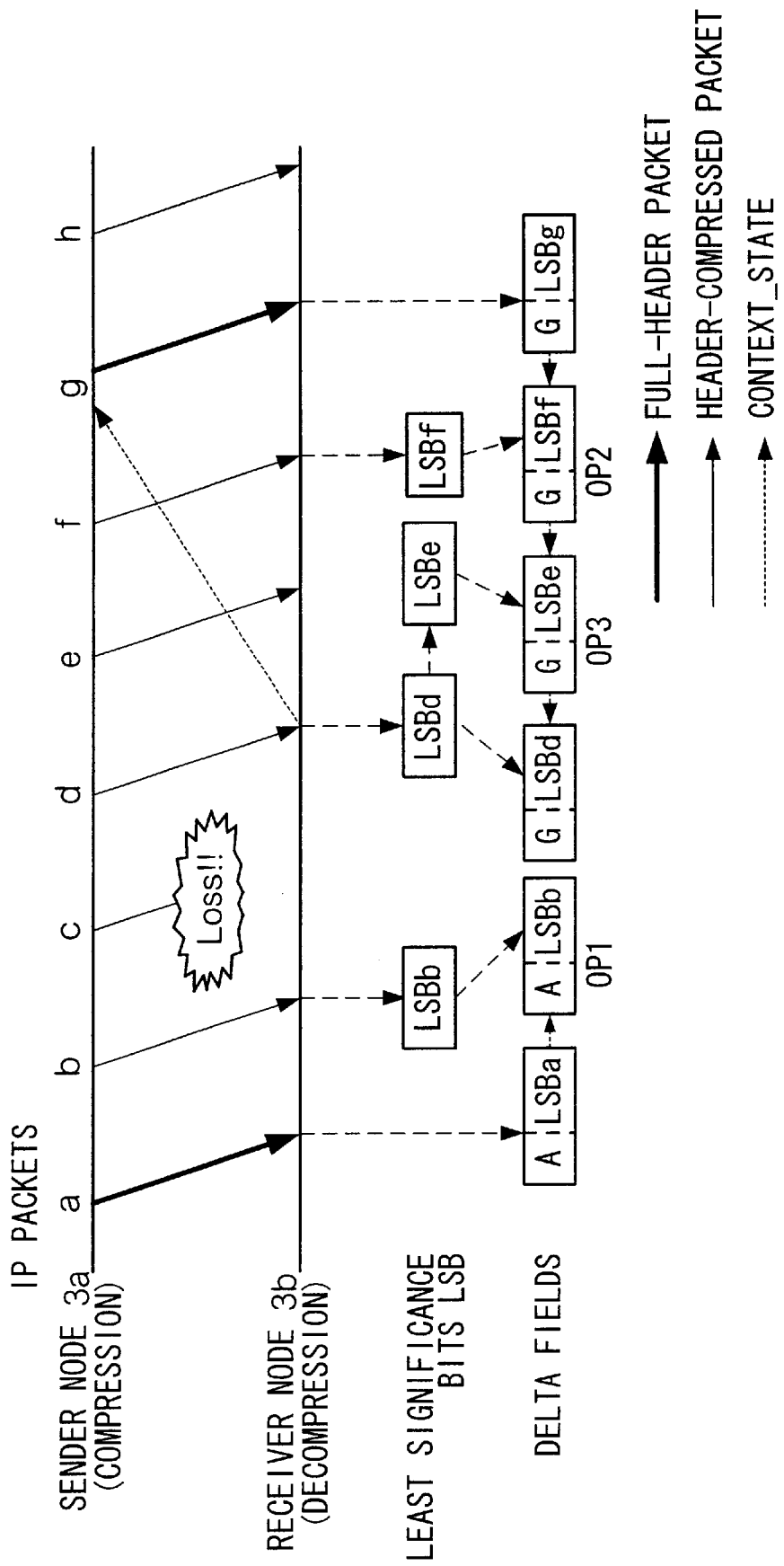
FIG. 10 is a timing chart showing an operation of a communication system according to the third embodiment of the present invention.
Figure 12:
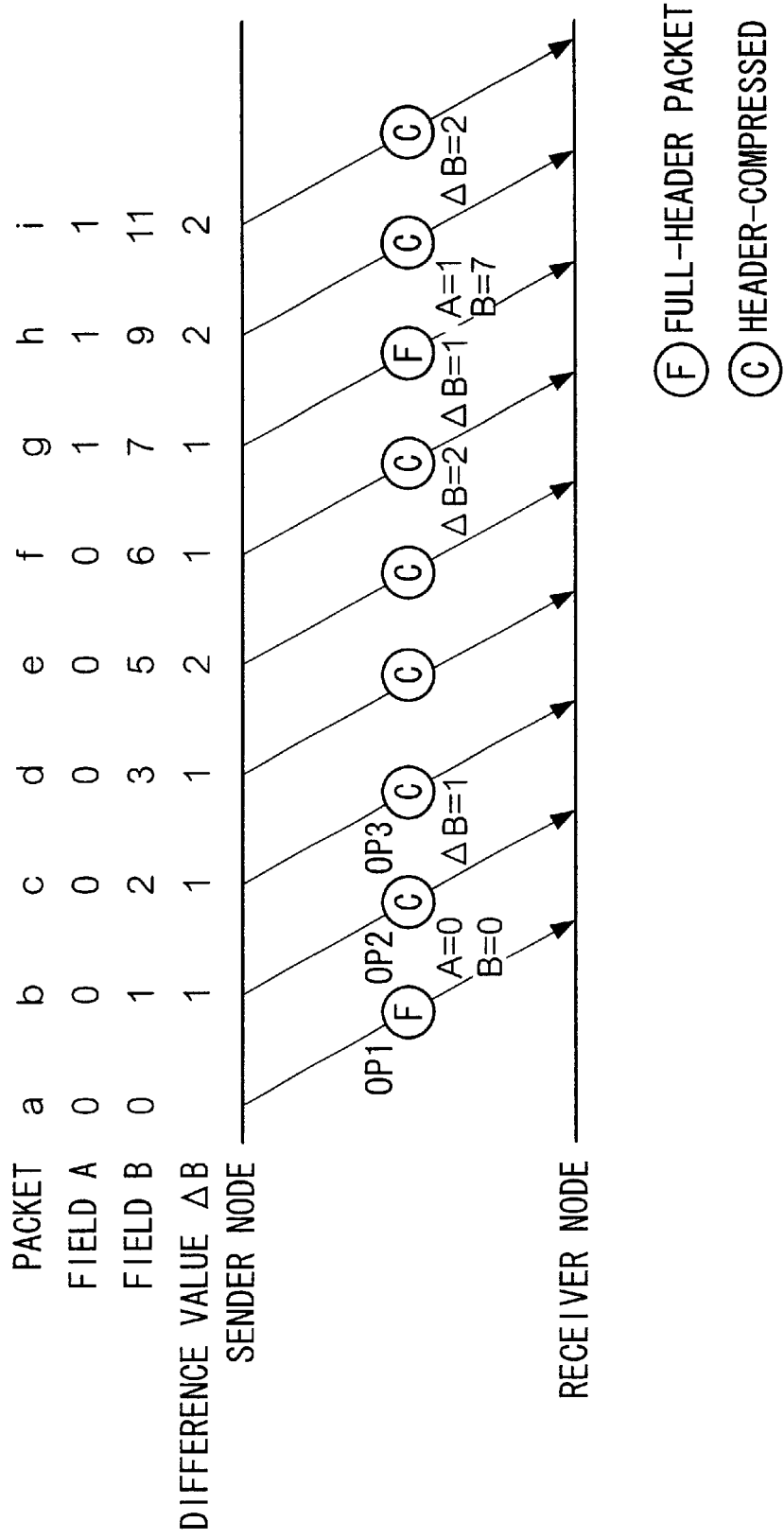
FIG. 12 is a timing chart exemplifying procedures of a conventional packet transmitting method (conventional method A).
Figure 13:
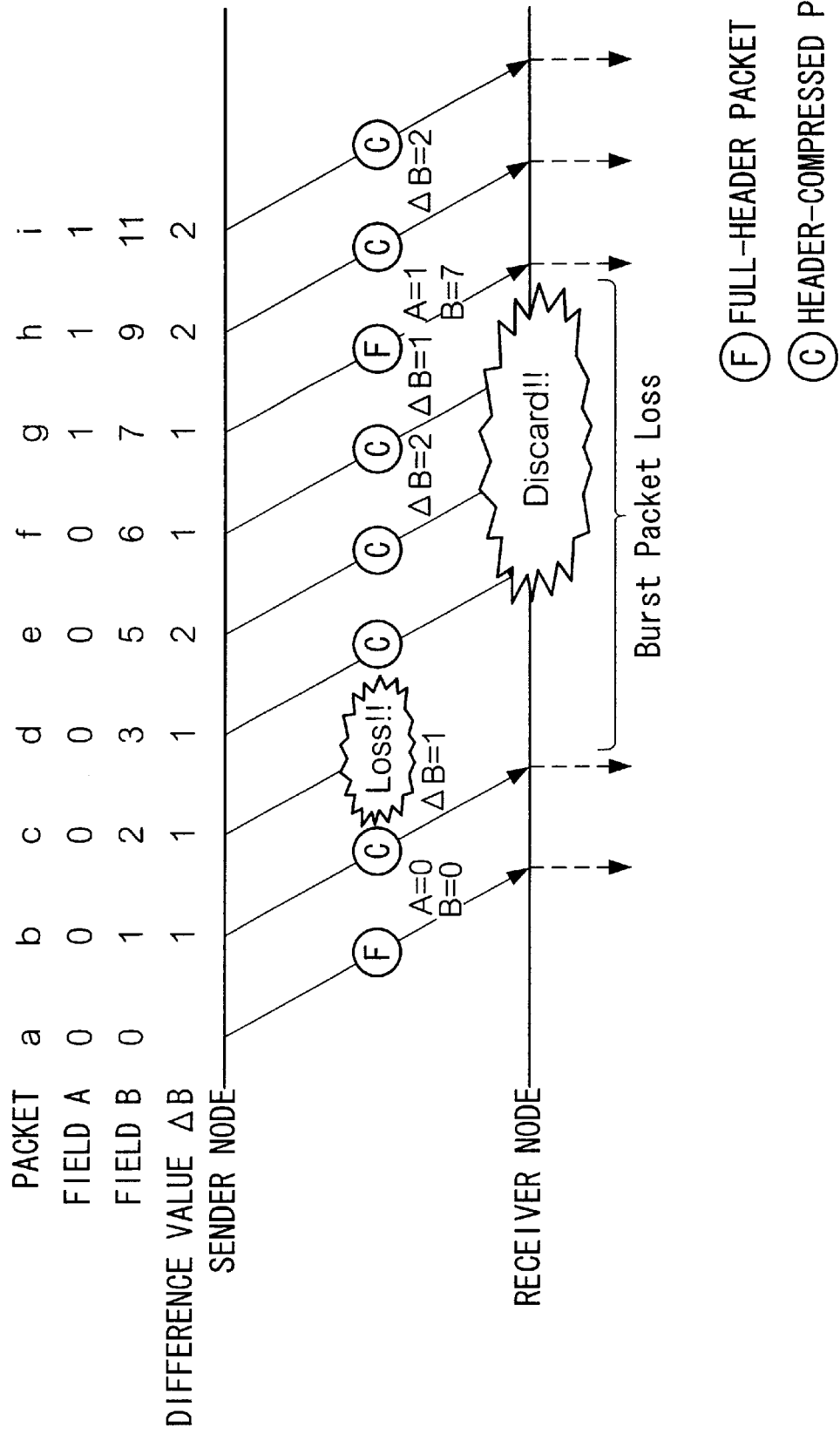
FIG. 13 is a timing chart illustrating a drawback of the conventional packet transmitting method.
Figure 14:
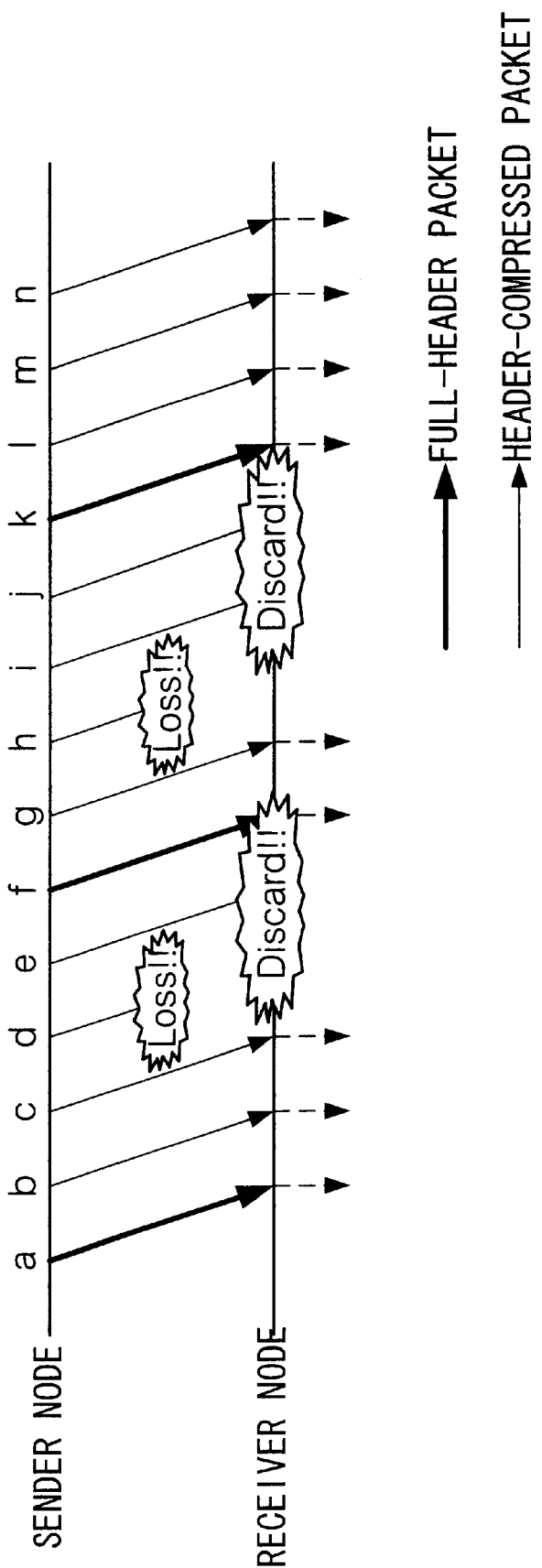
FIG. 14 is a timing chart exemplifying procedures of a conventional packet transmitting method (method 1).
Figure 15:
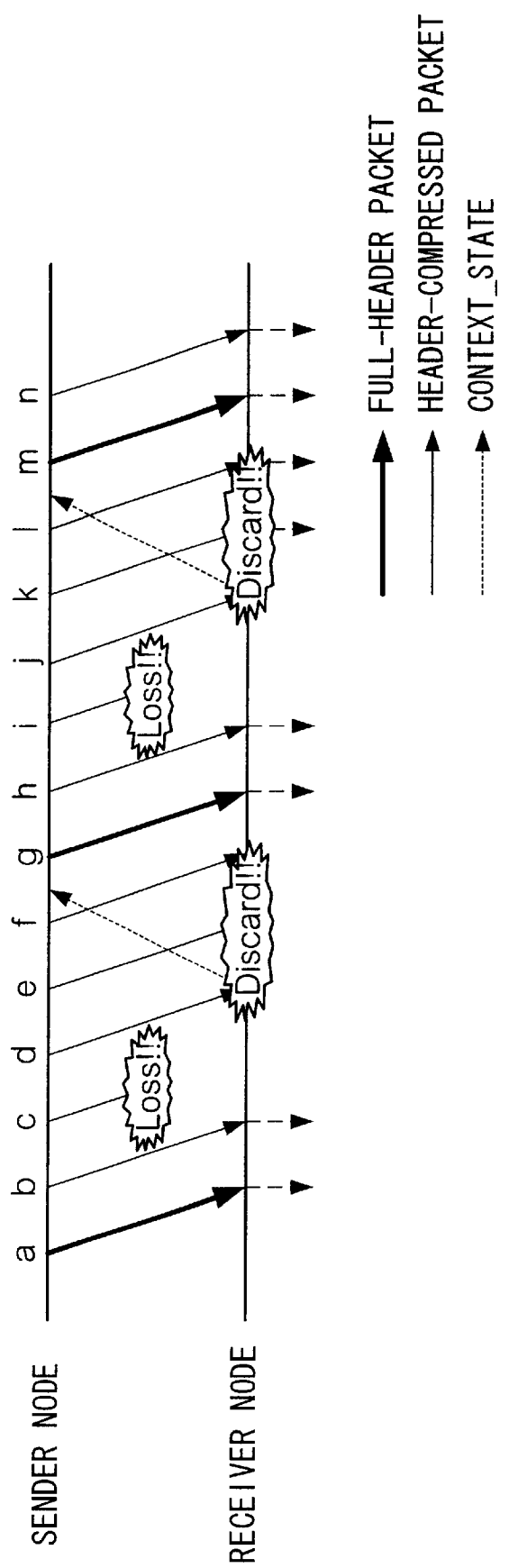
FIG. 15 is a timing chart exemplifying procedures of a conventional packet transmitting method (method 2).
Figure 16:
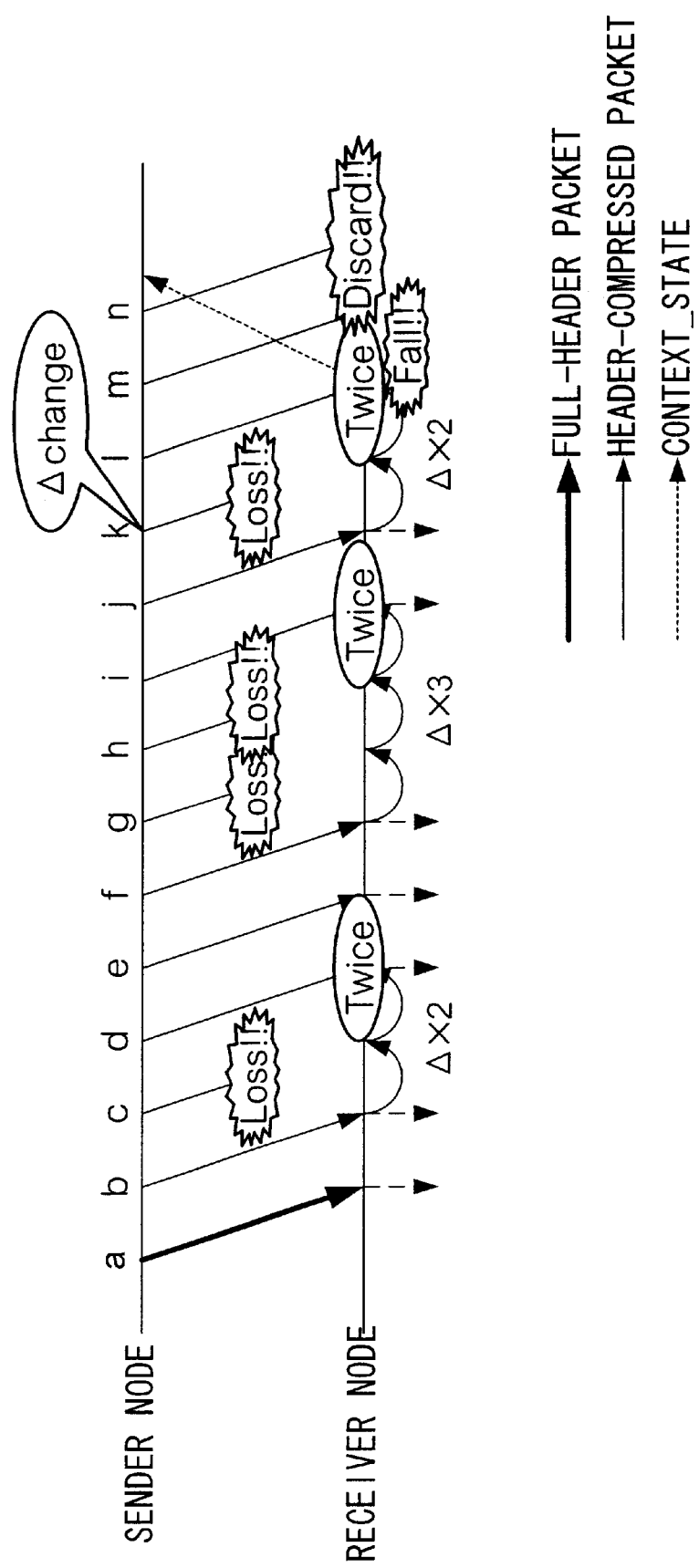
FIG. 16 is a timing chart exemplifying procedures of a conventional packet transmitting method (method 3).
Figure 17:
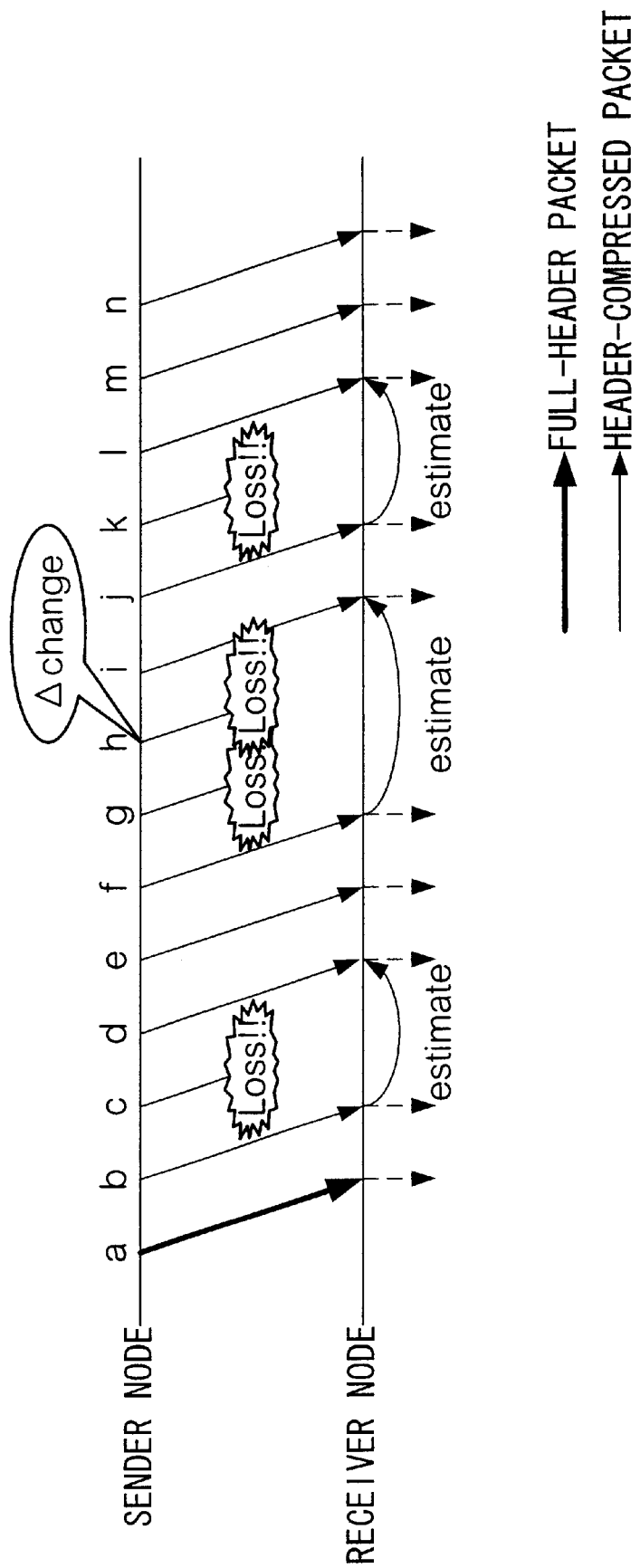
FIG. 17 is a timing chart exemplifying procedures of a conventional packet transmitting method (method 4).

Referring to FIG. 10, an operation of the present embodiment will now be explained. As described in the first embodiment, the delta fields include the ID of the IP header and the sequence number and timestamp of the RTP header, but they are generalized as a "delta field," for the sake of simplification.

First, the sender node 3a receives IP packets from the sender data terminal 1. Concurrently with the reception, the node 3a sends the first received IP packet a, as the full-header packet to the receiver node 3b, and then sends the packets b to f as header-compressed packets. In FIG. 10, it is assumed that the CONTEXT_STATE is received from the receiver node 3b just before receiving an IP packet g. Hence, the sender node 3a sends the IP packet g, as a full-header packet, to the receiver node 3b. As stated above, among the compressed headers of the header-compressed packets, only compressed headers of which the delta fields are changed in values include the LSBs. In FIG. 10, the case is depicted based on the condition in which the header-compressed packets b, d and f include the LSBb, LSBd and LSBf, respectively, while the header-compressed packet e does not include such LSBs.

On the other hand, the control portion 33b of the receiver node 3b decompresses an IP packet a based on the full-header packet a first received from the sender node 3a. The control portion 33b stores the decompressed IP packet into the storage portion 34b, and then sends the IP packet a to the receiver data terminal 2. The control portion 33b operates to decompress the next received header-compressed packet b using the IP packet a. To be more specific, as shown in FIG. 10, the delta fields of the IP packet a stored in the storage portion 34b are read out. And the LSBa of the delta fields are replaced by the LSBb included in the header-compressed packet b, so that the delta fields of the header-compressed packet b are decompressed (refer to "OP1" shown in FIG. 10). The control portion 33b produces an IP packet b having those delta fields. The control portion 33b stores the produced IP packet b into the storage portion 34b and sends it to the receiver data terminal 2.

In FIG. 10, the case is illustrated on the assumption that the header-compressed packet c sent from the sender node 3a is lost, due to some reason, before being received by the receiver node 3b. The control portion 33b of the receiver node 3b detects the loss of the header-compressed packet c by receiving the header-compressed packet d next to the header-compressed packet b. In response to this detection, the control portion 33b will send the CONTEXT_STATE to the sender node 3a.

After the loss of the packet c, the control portion 33b stores in sequence the header-compressed packets d to f into the storage portion 34b, until receiving the next full-header packet g. In practice, when a header-compressed packet including the LSBs is received, the header-compressed packet is stored in the storage portion 34b with the LSBs. When a header-compressed packet including no LSBs is received, the header-compressed packet that was received most lately before receiving the header-compressed packet with no LSBs and includes the LSBs is selected, and the LSBs are stored into the storage portion 34b with the header-compressed packet with no LSBs. For example, in the case as shown in FIG. 10, the header-compressed packet e does not have any LSBs. The LSBd of the header-compressed packet d, which was received just before the packet e and includes the LSBs, is handled as the LSBe and stored in the storage portion 34b together with the header-compressed packet e.

Then, when receiving the full-header packet g sent from the sender node 3a in response to the CONTEXT_STATE that was transmitted to the sender node 3a beforehand, the control portion 33b performs the procedures to decompress the header-compressed packets d to f, which has been stored in the storage portion 34b, based on the contents of the full-header packet g. Hereinafter, the decompressing processing will now be described.

Firstly, the control portion 33b decompresses the full-header packet g into an IP packet g, and stores the IP packet in the storage portion 34b. In FIG. 10, the LSBs and the other bits are noted by "LSBg" and "G," respectively in the delta field of the IP packet g.

The control portion 33b then reads out the delta fields of the IP packet g from the storage portion 34b, and decompresses the delta fields of the header-compressed packet f. Namely, the LSBg of the delta fields of the packet g is replaced by the LSBf of the corresponding delta field of the header-compressed packet f stored in the storage portion 34b, thus the delta fields of the packet f being decompressed (refer to "OP2" in FIG. 10). The control portion 33b produces an IP packet f including both of the decompressed delta fields and the static fields of the IP packet g. The control portion 33b then determines that the decompression was correctly done or not using the checksum included in the IP packet f.

When the IP packet f was decompressed correctly, this IP packet f is used to decompress the header-compressed packet e. More specifically, the control portion 33b replaces the LSBf of the delta fields of the IP packet f with the LSBe (identical to LSBd in contents) of the header-compressed packet e stored in the storage portion 34b, so that the delta fields of the header-compressed packet e are decompressed (refer to "OP3" in FIG. 10). In contrast, when the IP packet f was not decompressed correctly, the header-compressed packet e is decompressed using the IP packet g received and decompressed as a full-header packet. That is, the control portion 33b replaces the lower bit train LSBg of the delta fields of the IP packet g with the LSBe corresponding to the header-compressed packet e stored in the storage portion 34b, so that the delta fields of the header-compressed packet e are decompressed.

After completion of the delta fields of the header-compressed packet e on the basis of the contents of the IP packet f or g, the control portion 33b proceeds to the production of an IP packet e. Practically, the control portion 33b combines the decompressed delta fields with the static fields of the IP packet f or g, producing the IP packet e. And the control portion 33b determines if the decompression was carried out correctly or not using the checksum included in the header-compressed packet e.

The control portion 33b will continue performing the same procedures on all the header-compressed packets received during the interval between detecting the loss of the packet c and receiving the full-header packet g. On completing the processing on all the header-compressed packets, the control portion 33b sends all correctly decompressed IP packets to the receiver data terminal 2, in turn, in the order of the sequence number included in each RTP header. However, IP packets which have not been decompressed correctly are discarded.

Therefore, like the foregoing embodiments, there is the advantage identical to the foregoing embodiments, because header-compressed packets received after a packet loss are consecutively decompressed based on a full-header packet received most early after the packet loss. Further, in the present embodiment, a certain header-compressed packet can be decompressed using either of a full-header packet received most early after a packet loss or an IP packet decompressed immediately before the header-compressed packet. For instance, in FIG. 10, either of the IP packet g formed by decompressing the full-header packet g or the IP packet e formed by decompressing the header-compressed packet e can be used to decompress the header-compressed packet d. As a result, even if the header-compressed packet e which should be decompressed just before the header-compressed packet d to be decompressed is not decompressed in order, the header-compressed packet d can be decompressed based on the contents of the IP packet g. The present embodiment of the invention therefore is able to improve efficiency in decompression, even compared to the forgoing embodiments.

As seen in the foregoing embodiments, the present invention relates to the method including the means to restore the contents of a header-compressed packet received and held after losing a packet on the basis of the contents of a full-header packet received most early after the packet loss. That is, a technique of using a full-header packet received most early after a packet loss to decompress header-compressed packets received after the packet loss is not restricted to methods described in the foregoing embodiments, but a variety of other ways can be used as well.

D: Fourth embodiment

The foregoing embodiments provides not only a function of permitting the relay apparatus on the sender node 3a to convert an IP packet into a header-compressed packet or a full-header packet (hereinafter, such a function is called "compression function.") but also a function of permitting the relay apparatus on the receiver node 3b to convert the header-compressed packet or the full-header packet into an IP packet (hereinafter, such a function is called "decompression function."). In contrast, the fourth embodiment provides a configuration in which both sender data terminal 1 and receiver node 3b have the compression function, while both sender node 3a and receiver data terminal 2 have the decompression function.

Practically, the sender data terminal 1 produces sequentially IP packets to be transmitted. In transmitting the IP packets, the terminal 1 sends to the sender node 3a, as full-header packets, both of the first IP packet and an IP packet that should be transmitted immediately after receiving the CONTEXT_STATE from the receiver node 3a. As to the remaining IP packets, the terminal 1 sends them as header-compressed packets to the sender node 3a.

The relay apparatus on the sender node 3a operates in a similar way to the relay apparatus on the receiver node 3b explained in the first embodiment. This operation causes the full-header packets and header-compressed packets, which are sent from the sender terminal 1, to be decompressed into IP packets, thus being sent to the receiver node 3b. Responsively to this sending, the receiver node 3b receives those IP packets and coverts them into full-header packets or header-compressed packets, before transmitting them to the receiver data terminal 2.

The receiver data terminal receives the full-header packets or header-compressed packets from the receiver node 3b, and converts them into IP packets. When detecting a packet loss occurred between the receiver node 3b and receiver data terminal 2, the receiver terminal 2 stores into its internal storage header-compressed packets received during the interval between the packet loss and the earliest reception of a full-header packet after the packet loss. Then, when receiving such a full-header packet, the terminal 2 decompresses the compressed headers of the header-compressed packets stored in the storage by using contents of the full header of the received full-header packet. Then, the receiver data terminal 2 operates to perform processing including display of images and output of sound based on data provided by the received IP packets. This configuration is therefore able to have similar advantages to the configurations described in the foregoing embodiments.

As described, the receiver data terminal is able to have the function to decompress contents of the compressed headers of header-compressed packets received until receiving a full-header packet most early after a packet loss, by using contents of the full header included in the full-header packet. This means that the packet transmitting method according to the present invention can be applied to any apparatus for transmitting and receiving packets on a network. That is, concepts of the "sender" and "receiver" cited in the claims of the present invention include data terminals from which packets are sent and date terminals to which packet are sent, as well as packet-relaying devices interchanging packet conversions between data terminals.

E: Variation (Variation 1)

In the foregoing embodiments, the sender node 3a have been configured such that an IP packet that should be sent immediately after receiving the CONTEXT_STATE from the receiver node 3b is sent to the receiver node 3b as a full-header packet. However, conditions for sending such IP packets are not limited to the condition mentioned above. IP packets which are sent from the sender node 3a as full-header packets can take various modes as follows.

a. First mode

When the static fields of the RTP/UDP/IP headers of an IP packet to be transmitted are not changed in values, it is possible for the sender node 3a to transmit, as stated in the foregoing embodiments, full-header packets only for both of an IP packet which should be transmitted first and an IP packet which should be transmitted immediately after receiving the CONTEXT_STATE from the receiver node. However, if the static fields are changed in values, it is required to send a packet of which static fields are changed in contents, as a full-header packet, as also stated in the conventional method A, in addition to those packets. To realize this additional sending, the control portion 33a of the sender node 3a is configured to send, as a full-header packet, a packet of which static fields are changed in contents. Alternatively, instead of IP packets sent immediately after the CONTEXT_STATE was received, only IP packets of which static fields are changed in contents can be sent as full-header packets.

b. Second embodiment

The sender node 3a may be configured to select, as shown as the method 1 in the explanation of the prior art, particular packets from packets transmitted in turn from the sender data terminal 1 at every predetermined number of pieces, and send them as full-header packets to the receiver node 3b.

The above first and second modes is similar to the foregoing embodiments in that the receiver node 3b can keep packets received until a full-header packet is received from the sender node 3a after the loss of a packet, and decompress the kept packets on contents of the full-header packet.

(Variation 2)

The full-header packet and header-compressed packet are not necessarily limited to the packets described above. Namely, packets of any configuration are applicable to the "full-header packet" of the present invention, if they have a function of synchronizing the content of the compressing operation in the sender node with the content of the decompressing operation in the receiver node. To be more specific, it is not always required that a full-header packet is able to restore a non-compressed packet on the basis of contents of the full-header packet itself. Moreover, a full-header packet is not always required to be produced based on an IP header. Rather, to have the above function is enough for a full-header packet. On the other hand, any configuration is available for a compressed header, if a header-compressed packet can be decompressed based on the contents of other packets such as IP packets which have decompressed full-header packets or header-compressed packets.

(Variation 3)

The checksum that is attached to a compressed-header packet and used to examine the correctness of the decompressed header is not limited to the UDP checksum. That is, any checksums calculated from the original packets or from the original RTP/UDP/IP headers, and attached to a compressed-header packet can be used for examining the correctness of the decompressed header.

(Variation 4)

The present invention can be embodied so as to record the program executing the packet reception, which is performed by the relay apparatus on the receiver node as described in the embodiments, into storage media readable by computers, and deliver the media to users, or provide the program to users through electronic communication circuits.

What is claimed is:

1. A packet transmitting method comprising the steps of:
   a packet transmission by a communication apparatus provided on a transmission node in a network, the packet transmission including an operation for converting a plurality of non-compressed packets to be transmitted into either a full-header packet with a full header or a header-compressed packet with a compressed header and transmitting a converted packet to a receiver node in the network; and a packet reception by a communication apparatus provided on the receiver node, the packet reception including an operation for receiving the full-header packet or the header-compressed packet transmitted from the sender and an conversion for converting a received packet to a decompression packet, the conversion including:

an operation for keeping, in cases a full-header packet or header-compressed packet is lost during transmission from the sender node to the receiver node, at least one header-compressed packets received during an interval between an occurrence of a packet loss and a reception of a next full-header packet, and an operation for decompressing a compressed header of the header-compressed packets thus kept, based on a content of a full header of the full-header packet received after the packet loss.

2. A packet transmitting method of claim 1, the operation for decompressing in the packet reception further including an operation for decompressing delta information in the kept header-compressed packets by reducing a difference value from the delta information included in the full header of the full-header packet received after the packet loss, the delta information being information which changes by the difference value between each of the non-compressed packets, respectively.

3. A packet transmitting method of claim 1, the packet transmission further including an operation for adding, to at least part of the full headers of a full-header packet converted from the non-compressed packet, a difference value of delta information between the non-compressed packet and another non-compressed packet, the delta information being information which changes by the difference value between each of the non-compressed packets, respectively, and the operation for decompressing in the packet reception further including an operation for decompressing, when receiving a full-header packet with a difference value after the packet loss, the delta information in the kept header-compressed packet, by using the difference value and delta information included in a full header of the received full-header packet.

4. A packet transmitting method of claim 3, wherein, in cases that a full-header packet corresponding to a non-compressed packet is transmitted and a delta information between the non-compressed packet and a non-compressed packet immediately before the non-compressed packet is different in a difference value from delta information of other non-compressed packet, the communication apparatus on the sender node adds a difference value to the full-header packet.

5. A packet transmitting method of claim 1, the packet reception further comprising an operation for decompressing static information of the kept header-compressed packets based on static information included in a full header of a full-header packet received immediately before or after said packet loss, the static information being information contained in non-compressed headers of non-compressed packets and identical between the non-compressed packets.

6. A packet transmitting method of claim 1, wherein each non-compressed header of the non-compressed packets includes delta information which changes by a difference value between the non-compressed packets, while a compressed header of at least part of the header-compressed packets includes partial bits which is a part of bits representing the delta information of the non-compressed header, and the packet reception further comprises an operation for decompressing delta information of the kept header-compressed packets by replacing part of bits representing delta information included in a full header of a full-header packet received after the packet loss, with partial bits included in a header-compressed packet previously obtained.

7. An relaying device intervening in a plurality of data terminals and relaying packets exchanged among the data terminals, comprising:

reception means for receiving a full-header packet with a full header or a header-compressed packet with a compressed header and converting a received packet into a decompressed packet;

keeping means for keeping, in cases the full-header packet or the header-compressed packet is lost before being received by the reception means, header-compressed packets received during an interval between a loss of the packet to a reception of a next full-header packet after the loss; and decompression means for decompressing a compressed header of each of the header-compressed packets kept by the keeping means, based on a content of a compressed header of a full-header packet received after the loss of the packet.

8. A data terminal capable of exchanging packets via a network with other data terminal, comprising:

reception means for receiving a full-header packet with a full header or a header-compressed packet with a compressed header and converting a received packet into a decompressed packet;

keeping means for keeping, in cases the full-header packet or header-compressed packet is lost before being received by the reception means, header-compressed packets received during an interval between the loss of the packet and a reception of a next full-header packet after the loss; and decompression means for decompressing a compressed header of each of the header-compressed packets kept by the keeping means, based on a content of a compressed header of a full-header packet received after the loss of the packet.

9. A packet reception method comprising the steps of:

receiving a full-header packet with a full header or a header-compressed packet with a compressed header and converting a received packet into a decompressed packet;

keeping, in cases the full-header packet or header-compressed packet is lost before being received, header-compressed packets received during an interval between the loss of the packet and a reception of a next full-header packet after the loss; and decompressing a compressed header of each of the header-compressed packets kept, based on a content of a compressed header of a full-header packet received after the loss of the packet.

10. A program for making a computer executing a packet reception method comprising the steps of:

receiving a full-header packet with a full header or a header-compressed packet with a compressed header and converting a received packet into a decompressed packet;

keeping, in cases the full-header packet or header-compressed packet is lost before being received, header-compressed packets received during an interval between the loss of the packet and a reception of a next full-header packet after the loss; and decompressing a compressed header of each of the header-compressed packets kept, based on a content of a compressed header of a full-header packet received after the loss of the packet.

11. A computer readable storage media storing a program for making a computer executing a packet reception method comprising the steps of:

receiving a full-header packet with a full header or a header-compressed packet with a compressed header and converting a received packet into a decompressed packet;

keeping, in cases the full-header packet or header-compressed packet is lost before being received, header-compressed packets received during an interval between the loss of the packet and a reception of a next full-header packet after the loss; and decompressing a compressed header of each of the header-compressed packets kept, based on a content of a compressed header of a full-header packet received after the loss of the packet.

* * * * *

UNITED STATES PATENT AND TRADEMARK OFFICE
CERTIFICATE OF CORRECTION

PATENT NO.     : 6,385,199 B2
DATED          : May 7, 2002
INVENTOR(S)    : Takeshi Yoshimura et al.

It is certified that error appears in the above-identified patent and that said Letters Patent is hereby corrected as shown below:

Column 25,
Lines 14-15, delete "and an" and substitute -- and a -- in its place.

Column 26,
Line 11, delete "An relaying" and substitute -- A relaying -- in its place.

Signed and Sealed this

Eighteenth Day of February, 2003

JAMES E. ROGAN
*Director of the United States Patent and Trademark Office*